United States Patent
Song et al.

(10) Patent No.: US 8,836,501 B2
(45) Date of Patent: Sep. 16, 2014

(54) METHODS AND DEVICES FOR SERVING AS A PROXY BEACON FOR A TRACKING DEVICE

(75) Inventors: Bongyong Song, San Diego, CA (US);
Soumya Das, San Diego, CA (US);
Kaushik Chakraborty, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 13/279,575

(22) Filed: Oct. 24, 2011

(65) Prior Publication Data
US 2013/0099920 A1   Apr. 25, 2013

(51) Int. Cl.
*G08B 1/08* (2006.01)
*G08B 21/02* (2006.01)
*G01S 5/00* (2006.01)
*G01S 1/68* (2006.01)
*G08B 25/00* (2006.01)

(52) U.S. Cl.
CPC ........ *G08B 21/0277* (2013.01); *G08B 21/0261* (2013.01); *G08B 25/004* (2013.01); *G08B 21/023* (2013.01); *G01S 5/0009* (2013.01); *G01S 1/68* (2013.01)
USPC ............... 340/539.13; 340/539.1; 340/539.17

(58) Field of Classification Search
CPC ......... H04W 4/02; H04W 4/008; H04W 4/00; G08B 21/00; G08B 21/18; G08B 25/00
USPC ....................... 340/539.13, 539.11
See application file for complete search history.

(56) References Cited

U.S. PATENT DOCUMENTS

| 6,463,142 | B1 | 10/2002 | Kilp |
| 6,889,135 | B2 | 5/2005 | Curatolo et al. |
| 7,155,238 | B2 * | 12/2006 | Katz .......................... 455/456.1 |
| 7,502,619 | B1 | 3/2009 | Katz |
| 7,705,728 | B2 * | 4/2010 | Mock et al. .............. 340/539.13 |
| 7,825,794 | B2 | 11/2010 | Janetis et al. |

(Continued)

FOREIGN PATENT DOCUMENTS

WO     2008006077 A2     1/2008

OTHER PUBLICATIONS

International Search Report and Written Opinion—PCT/US2012/061697—ISA/EPO—Apr. 2, 2013.

(Continued)

*Primary Examiner* — Kerri McNally
(74) *Attorney, Agent, or Firm* — Jeffrey D. Jacobs

(57) ABSTRACT

One feature includes a mobile device being used as a mobile beacon and proxy for a tracking device that may track an object, such as a pet. The mobile device may act as a beacon that transmits messages over a short range communications link to the tracking device. If the tracking device fails to receive the messages transmitted by the mobile device, it may be assumed that the pet has gone missing, and in response the tracking device may contact a tracking server with its location information via a wireless wide area network (WWAN). Additionally, the mobile device may act as a proxy of the tracking device by transmitting and receiving data to/from the tracking server using its own communication interface on behalf of the tracking device. This helps conserve the battery power of the tracking device because the tracking device does not use its own WWAN interface.

30 Claims, 13 Drawing Sheets

(56) References Cited

U.S. PATENT DOCUMENTS

| | | |
|---|---|---|
| 8,026,814 B1 | 9/2011 | Heinze et al. |
| 8,373,538 B1 * | 2/2013 | Hildner et al. .................. 340/3.1 |
| 2003/0146835 A1 * | 8/2003 | Carter ....................... 340/539.13 |
| 2004/0063426 A1 | 4/2004 | Hunkeler |
| 2007/0096898 A1 * | 5/2007 | Chou ........................ 340/539.13 |
| 2007/0285258 A1 | 12/2007 | Hartman |
| 2009/0224909 A1 | 9/2009 | Derrick et al. |
| 2010/0004003 A1 * | 1/2010 | Duggal et al. ............. 455/456.3 |
| 2010/0195569 A1 * | 8/2010 | Matsushita et al. ........... 370/328 |

OTHER PUBLICATIONS

Partial International Search Report—PCT/US2012/061697—ISA/EPO—Feb. 7, 2013.

* cited by examiner

METHODS AND DEVICES FOR SERVING AS A PROXY BEACON FOR A TRACKING DEVICE

BACKGROUND

1. Field

One feature relates to wireless communications, and, more particularly, to a method of serving as a proxy beacon for a device used to track an object, such as a pet.

2. Background

Prior art pet tracking systems include a wireless, battery powered pet tracking device that is carried by the pet, and a home beacon station that communicates with the pet tracking device. In these systems, the pet tracking device communicates with the home beacon station over a low-power communications interface like Bluetooth® or other short-range radio.

When the pet, carrying the pet tracking device, leaves the proximity of the home beacon station, the pet tracking device loses the beacon signal. This may happen when the pet leaves the premises of the pet owner's home (e.g., the pet escapes), the pet owner takes the pet for a walk, or when the pet enters a "dead zone," which is a part of the owner's property where the home beacon station signal is too weak. When the beacon signal is lost, the pet tracking device communicates with a central server through a wireless wide area network (WWAN), such as a cellular network, using a relatively high power wireless communications interface. Specifically, the pet tracking device may transmit information to the central server indicating that the pet may have escaped, and if the pet tracking device includes a global positioning system (GPS) receiver, it may also communicate location information. The central server may then contact the pet owner and inform them of the whereabouts of the pet.

The pet tracking device that is affixed to the pet should ideally be small so as to cause as little interference with the pet's day to day activities as possible. Thus, the battery used to power the pet tracking device also needs to be small, and therefore it will be inherently limited in its power capacity. However, transmitting data to the central server using the WWAN communications interface of the pet tracking device consumes significant power. For example, merely turning on and initiating the WWAN communications interface and a WWAN modem associated with the WWAN communications interface in anticipation of transmissions and receptions uses considerable battery power. In addition, the long range transmissions of data add to the power consumption in a very measurable way. Thus, the batteries of pet tracking devices of the prior art may need to be replaced or charged frequently, particularly, if the pet tracking device communicates often with the central server via the WWAN.

Thus, there is a need for methods and devices that extend the battery life of a tracking device without compromising the effectiveness and ability of the tracking device to communicate information, such as location information and other data, to a central server.

SUMMARY

One feature provides a method operational at a wireless communication device for tracking that comprises: serving as a beacon for a tracking device by transmitting a beacon signal to the tracking device; and serving as a proxy to the tracking device by communicating with a tracking server on behalf of the tracking device. The method may further comprise receiving tracking device data from the tracking device via a short range communications link. Moreover, serving as the proxy to the tracking device may comprise transmitting the tracking device data to the tracking server. The tracking device data may comprise at least one of a check-in message, a walk-in message, a walk-out message, or a location information. Furthermore, serving as the proxy to the tracking device by communicating with the tracking server on behalf of the tracking device may comprise communicating with the tracking server via a wireless wide area network (WWAN). Serving as the proxy to the tracking device by communicating with the tracking server on behalf of the tracking device may also comprise communicating with the tracking server via a wireless local area network (WLAN). The method may further comprise receiving tracking server data from the tracking server. Serving as the proxy to the tracking device may also comprise transmitting the tracking server data to the tracking device via a short range communications link. The method may further comprise receiving a beacon request message from the tracking device. In one aspect, the method may further comprise transmitting a beacon availability message to the tracking device, and receiving a beacon confirmation message from the tracking device. The beacon availability message may comprise at least one of energy efficiency information, signal to noise ratio (SNR) information, a first communications interface type of the wireless communication device, or a short range communications interface type of the wireless communication device. In one aspect, the method may further comprise receiving a unicast beacon request page from the tracking device, and establishing a short range communications link with the tracking device. In one aspect the beacon signal transmitted to the tracking device supplements another beacon signal associated with another beacon. The method may further comprise receiving tracking device data associated with the tracking device from a relay device via a peer to peer (P2P) connection. The method may further comprise: receiving a request from the tracking device to obtain tracking server data via a short range communications link; transmitting the request to the tracking server for the tracking server data via a first communications interface; receiving the tracking server data from the tracking server via the first communications interface; and transmitting the tracking server data to the tracking device via the short range communications link. The tracking server data may comprise global positioning system (GPS) XTRA data.

Another feature provides a wireless communication device that comprises: a short range communications interface adapted to wirelessly communicate with a tracking device via a short range communications link (SRCL); a first communications interface adapted to communicate with a tracking server; and a processor communicatively coupled to the short range communications interface and the first communications interface, the processor adapted to serve as a beacon for the tracking device by transmitting a beacon signal to the tracking device, and serve as a proxy to the tracking device by communicating with the tracking server on behalf of the tracking device. The processor may be further adapted to receive tracking device data from the tracking device via the SRCL. The processor adapted to serve as the proxy to the tracking device may comprise transmitting the tracking device data to the tracking server. The processor adapted to serve as the proxy to the tracking device by communicating with the tracking server on behalf of the tracking device may comprise communicating with the tracking server via a wireless wide area network (WWAN) using the first communications interface. The processor may be further adapted to receive tracking server data from the tracking server. The processor may be further adapted to transmit the tracking server data to the tracking device via the SRCL. In one aspect, the processor may be further adapted to receive a beacon request message from the tracking device. In another aspect, the processor may be further adapted to transmit a beacon availability message to the tracking device, and receive a beacon confirmation message from the tracking device. The processor may be further adapted to receive a unicast beacon request page from the tracking device, and establish the short range communications link with the tracking device. The processor may be further adapted to: receive a request from the tracking device to obtain tracking server data via the SRCL; transmit the request to the tracking server for the tracking server data via the first communications interface; receive the tracking server data from the tracking server via the first communications interface; and transmit the tracking server data to the tracking device via the SRCL.

Another feature provides a wireless communication device that comprises: means for serving as a beacon for a tracking device by transmitting a beacon signal to the tracking device; and means for serving as a proxy to the tracking device by communicating with a tracking server on behalf of the tracking device.

Another feature provides a computer readable medium having instructions for tracking, which when executed by one or more processors causes the processor to: serve as a beacon for a tracking device by transmitting a beacon signal to the tracking device; and serve as a proxy to the tracking device by communicating with a tracking server on behalf of the tracking device.

Another feature provides a method operational at a tracking device for tracking that comprises: transmitting a beacon request message to a plurality of beacons; receiving a plurality of beacon availability messages from the plurality of beacons; ranking the plurality of beacons by applying a rule set to the plurality of beacon availability messages, the ranking determining an order of beacons with which to associate with; and associating with a first beacon of the plurality of beacons based on the order of beacons. Each of the plurality of beacon availability messages may comprise identification information and at least one of energy efficiency information, signal to noise ratio (SNR) information, a first communications interface type of the beacon, or a short range communications interface type of the beacon. The method may further comprise caching at least one of the beacon availability messages. In one aspect, prior to transmitting the beacon request message to the plurality of beacons, the method further comprises losing a beacon signal associated with another beacon. In another aspect, prior to transmitting the beacon request message to the plurality of beacons, the method further comprises determining that a signal to noise ratio (SNR) of a communications link between another beacon and the tracking device is below a predetermined threshold. In yet another aspect, prior to transmitting the beacon request message to the plurality of beacons, the method further comprises determining to use a different short range communications protocol than one used with another beacon the tracking device associated with. The method may further comprise establishing a long range communications link with a tracking server via a wireless wide area network (WWAN). In one aspect, ranking the plurality of beacons by applying the rule set to the plurality of beacon availability messages comprises calculating the ranking based on the rule set that comprises at least one of energy efficiency parameter, signal to noise ratio (SNR) parameter, a first communications interface type parameter, or a short range communications interface type parameter. In one aspect, the order of beacons with which to associate with comprises a second beacon of the plurality of beacons, the first beacon having a first short range communications interface that is more energy efficient than a second short range communications interface of the second beacon.

Another feature provides a tracking device that comprises: a short range communications interface adapted to communicate with a plurality of beacons via a short range communications link; a processor communicatively coupled to the short range communications interface, the processor adapted to transmit a beacon request message to the plurality of beacons via the short range communications link, receive a plurality of beacon availability messages from the plurality of beacons via the short range communications link, rank the plurality of beacons by applying a rule set to the plurality of beacon availability messages, the ranking determining an order of beacons with which to associate with, and associate with a first beacon of the plurality of beacons based on the order of beacons. The processor may be further adapted to cache at least one of the beacon availability messages. Prior to transmitting the beacon request message to the plurality of beacons, the processor may be further adapted to lose a beacon signal associated with another beacon. Prior to transmitting the beacon request message to the plurality of beacons, the processor may be further adapted to determine that a signal to noise ratio (SNR) of a communications link between another beacon and the tracking device is below a predetermined threshold. Prior to transmitting the beacon request message to the plurality of beacons, the processor may be further adapted to determine to use a different short range communications protocol than one used with another beacon the tracking device associated with. The processor may be further adapted to establish a long range communications link with a tracking server via a wireless wide area network (WWAN).

Another feature provides for a tracking device that comprises: means for transmitting a beacon request message to a plurality of beacons; means for receiving a plurality of beacon availability messages from the plurality of beacons; means for ranking the plurality of beacons by applying a rule set to the plurality of beacon availability messages, the ranking determining an order of beacons with which to associate with; and means for associating with a first beacon of the plurality of beacons based on the order of beacons.

Another feature provides for a computer readable medium having instructions stored thereon for tracking, which when executed by one or more processors cause the processor to: transmit a beacon request message to a plurality of beacons; receive a plurality of beacon availability messages from the plurality of beacons; rank the plurality of beacons by applying a rule set to the plurality of beacon availability messages, the ranking determining an order of beacons with which to associate with; and associate with a first beacon of the plurality of beacons based on the order of beacons.

BRIEF DESCRIPTION OF THE DRAWINGS

The features, nature, and advantages of the present features may become more apparent from the detailed description set forth below when taken in conjunction with the drawings in which like reference characters identify correspondingly throughout.

FIG. 8 illustrates a process flow diagram where a tracking device uses a rule set to determine which of a plurality of beacons to associate with.

DETAILED DESCRIPTION

In the following description, specific details are given to provide a thorough understanding of some of the aspects of the present disclosure. However, it will be understood by one of ordinary skill in the art that the aspects may be practiced without these specific details. For example, circuits may be shown in block diagrams in order not to obscure the aspects in unnecessary detail. In other instances, well-known circuits, structures and techniques may not be shown in detail in order not to obscure the aspects.

In the following description, certain terminology is used to describe certain features of one or more aspects of the disclosure. For instance, the term "mobile device" includes, but is not limited to, a wireless device, a mobile phone, a mobile communication device, a user communication device, a personal digital assistant, a mobile palm-held computer, a laptop computer, a portable television, and a smartphone.

Overview

Techniques for using a mobile device (e.g., a smartphone) as a mobile beacon and proxy for a tracking device are disclosed. In particular, the mobile device may act as a beacon that periodically or sporadically transmits messages over a short range communications link to the tracking device used to track the location of an object, such as a pet or child. If the tracking device fails to receive the messages transmitted by the mobile device, it may be assumed that the pet has gone missing, and in response the tracking device may contact a tracking server with its location information via a wireless wide area network (WWAN).

In addition, the mobile device may act as a proxy of the tracking device by transmitting and receiving data to/from the tracking server using its own communications interface (e.g., WWAN interface) on behalf of the tracking device. The mobile device may do this when the tracking device is within an approved range of the mobile device. This helps conserve the battery power of the tracking device, which may ordinarily have had to transmit this data itself using its own relatively high power WWAN communications interface.

Moreover, techniques are disclosed for a tracking device to establish a short range communications link with one or more mobile devices based on a rule set. For example, the tracking device may determine which of a plurality of mobile devices to connect to depending on various communications metrics.

Exemplary Network Environment

Figure 1:
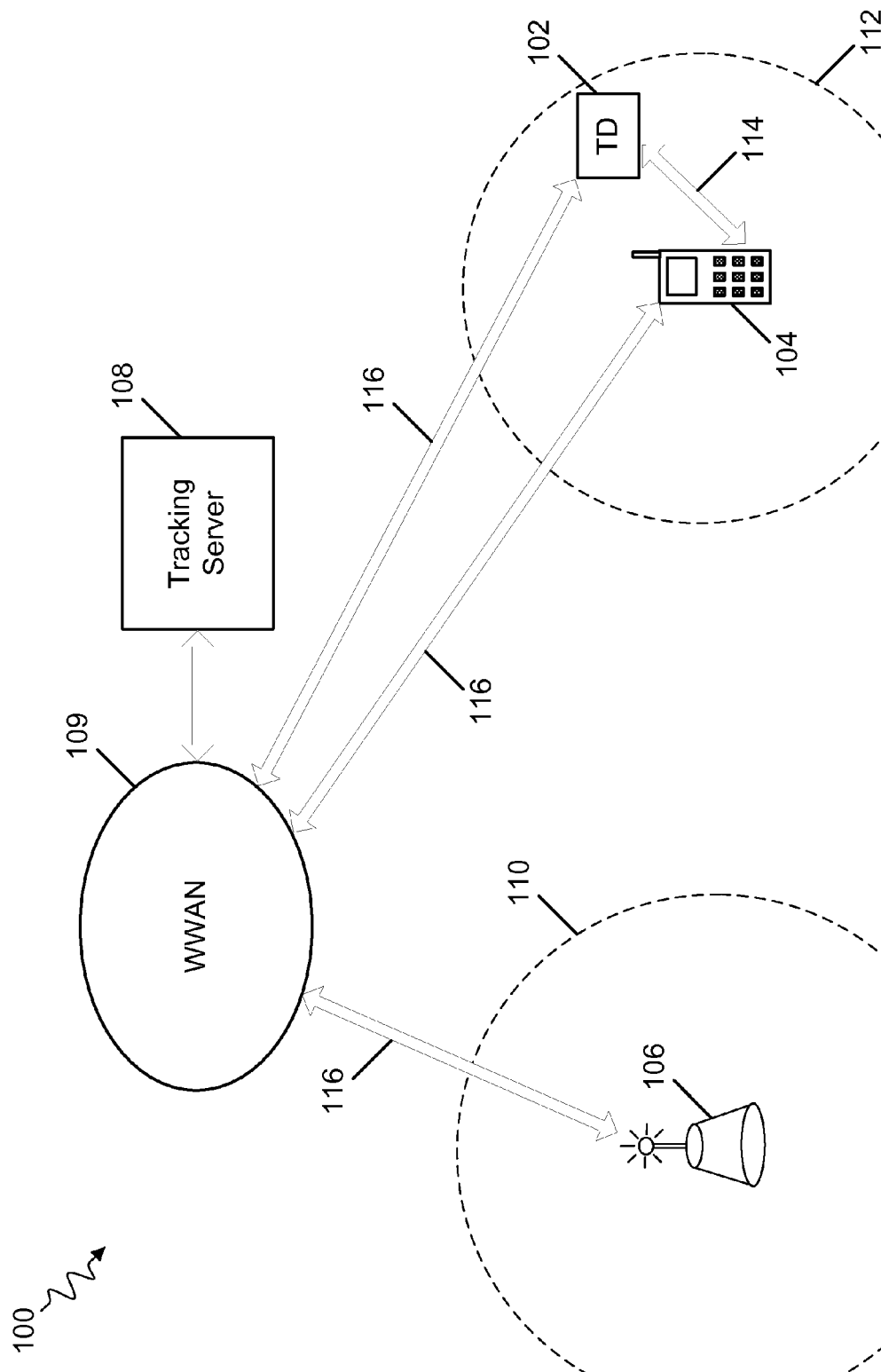
FIG. 1 illustrates a functional diagram of a tracking system featuring a tracking device, a mobile device, a fixed beacon, and a tracking server.

FIG. 1 illustrates a functional diagram of a tracking system 100 according to one aspect of the present disclosure that features a tracking device 102, a mobile device (also referred to herein as a "mobile beacon") 104, a fixed beacon (also referred to herein as a "home beacon") 106, and a tracking server 108. The tracking device 102 is a battery powered wireless device that is designed to be attached to the object one wishes to track, such as a pet or child. In many of the examples below, it will be assumed that the object being tracked is a pet, but the tracking device 102 may be affixed to many other objects that a user may desire to track.

The mobile beacon 104 is a wireless communications device, such as a smartphone, that is capable of communicating over both a wireless wide area network (WWAN) 109 and also a short range communications link. The home beacon 106 is an electronic device also having wireless communications capability. Specifically, the home beacon 106 is capable of communicating over a short range communications link, and in some aspects of the present disclosure the WWAN 109 as well. While the mobile beacon 104 is "mobile" in the sense that it can be conveniently carried around by a user, the home beacon 106 is considered "fixed" since its mobility is limited because it draws its power from a mains power source (i.e., a wall outlet). The tracking server 108 is connected to the WWAN 109, and data may be exchanged between the tracking server 108 and the tracking device 102 and the beacons 104 and 106 via WWAN 109. In one example, FIG. 1 illustrates that the mobile beacon 104 and the tracking device 102 have established a short range communications link 114 with one another. The tracking device 102, the mobile beacon 104, and the home beacon 106 have also established a long range communications link 116 with the WWAN 109, thereby enabling them to communicate with the tracking server 108.

The home beacon 106 may be situated, for example, at the property of the pet owner (also referred to herein as a "user") where the pet typically resides. The home beacon 106 transmits a beacon signal within a perimeter 110 that may be geographically sized to encompass the pet owner's property. As long as the tracking device 102, and the pet to which it is attached, remain within the perimeter 110 of the home beacon 106, the tracking device 102 receives the beacon signal and no action is taken because the pet is presumed to be within an authorized, safe area. Thus, a "geo-fence" for the pet is established bounded by the beacon signal range within the perimeter 110.

In the event the tracking device 102 leaves the perimeter 110 the tracking device 102 will lose reception of the beacon signal. In one aspect of the present disclosure, after a predefined period of time has elapsed without reception of beacon signal, the tracking device 102 establishes a communications link with the tracking server 108 via the WWAN 109. Specifically, the tracking device 102, which may be equipped with a global positioning system (GPS) receiver, transmits its location and identification (ID) information to the tracking server 108. The tracking server 108 may then notify the pet owner of the location of the pet through a number of different ways. For example, the pet owner may obtain the location information of their pet by accessing a website associated with the tracking server 108. As another example, the location information may be transmitted to a cellular phone or other phone associated with the pet owner.

However, there may be numerous instances where the pet is not within the perimeter 110 region of the home beacon 106, but yet the pet is presumed to be safe and within an authorized area. During such instances, it may be unnecessary and undesirable for the tracking device 102 to establish communications with the tracking server 108 via the WWAN 109, which consumes valuable battery power. For example, the pet may be taken for a walk by the pet owner, or another caretaker, and exit the perimeter 110 of the home beacon 106 with the pet owner (e.g., user).

In such cases, the smartphone of the user who is taking the pet for a walk may act as the mobile beacon 104. The mobile beacon 104 transmits a beacon signal within a perimeter 112 that may be received by the tracking device 102. Since the mobile beacon 104 moves with the user, the perimeter 112 surrounding the mobile beacon 104 moves accordingly. As long as the tracking device 102, and the pet to which it is attached, remain within the perimeter 112 of the mobile beacon 104, the tracking device 102 receives the beacon signal and no action is taken because the pet is presumed to be within an authorized, safe area. In this sense, a mobile geo-fence for the pet is established bounded by the beacon signal range within the perimeter 112 that moves with the mobile beacon 104. If while during the walk the pet carrying the tracking device 102 leaves the perimeter 112 of the mobile beacon 104 (e.g., the pet runs away from the user), the tracking device 102 may establish a communications link with the tracking server 108 via the WWAN 109 to notify the user of the location of the pet and tracking device 102.

Thus, as long as the tracking device 102 is within one of the perimeter regions 110, 112 the pet is assumed to be safe, and the tracking device 102 does not have to directly establish communications with the tracking server 108 using its WWAN communications interface. This allows the pet having the tracking device 102 to go on walks with the user carrying the mobile beacon 104 without expending unnecessary battery power of the tracking device 102 through direct long range communications with the tracking server 108.

Exemplary Mobile Beacon

Figure 2:
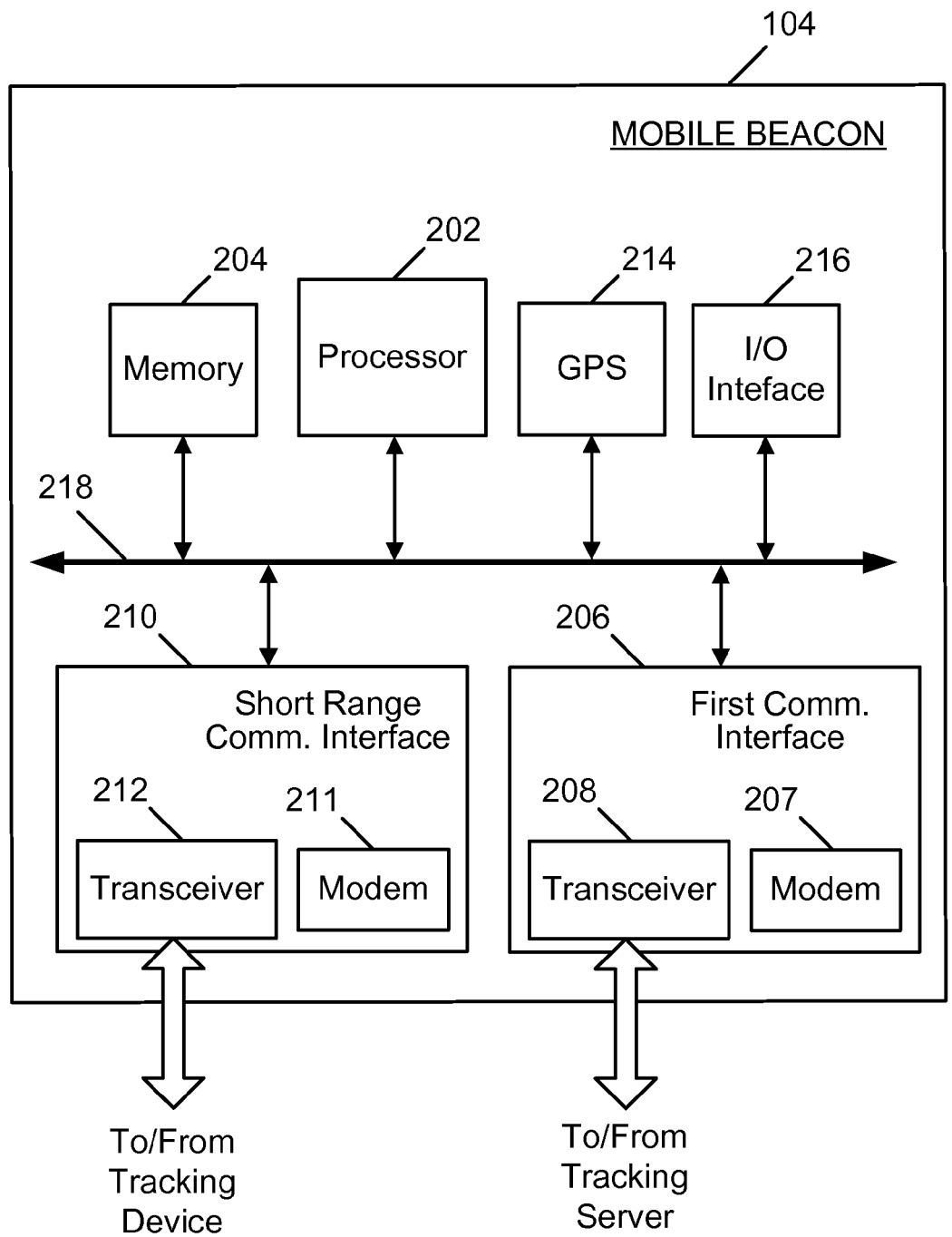
FIG. 2 illustrates a functional block diagram of one example of a mobile beacon.

FIG. 2 illustrates a functional block diagram of the mobile beacon 104 according to one aspect of the present disclosure. The mobile beacon 104 may include a processing circuit (e.g., processor, processing module, etc.) 202, a memory circuit (e.g., memory, memory module, etc.) 204, a first communications interface 206, a second communications interface (also referred to herein as a "short range communications interface") 210, a GPS receiver 214, and an input/output (I/O) interface 216. All or some of these components may communicate with one another via a bus 218. The first communications interface 206 may include, among other components, a communications modem 207 and a communications transceiver 208. The short range communications interface 210 may include, among other components, a short range communications modem 211 and a short range communications transceiver 212.

The processing circuit 202 is adapted to process data. For example the processing circuit 202 may process data and requests received from, and/or transmitted to, the tracking device 102, in addition to processing data and requests received from, and/or transmitted to, the tracking server 108. The memory circuit 204 is adapted to store data. The memory circuit 204 may be volatile memory and/or non-volatile memory, including but not limited to DDR SDRAM, FLASH memory, one time programmable read only memory (ROM), etc. The memory circuit 204 is adapted to store data received from and/or transmitted to the tracking device 102 and tracking server 108. The GPS receiver 214 receives global positioning system (GPS) signals from GPS satellites, and determines the location of the mobile beacon 104. The I/O interface 216 may include a plurality of input devices such as buttons, a touch-screen, USB input connectors, etc., and a plurality of output devices such as speakers, a display, etc.

The short range communications interface (SRCI) 206 is a wireless communications interface that is relatively low power, and limited in range in comparison to, for example, the long range communications interface 210. The SRCI 206 may include hardware and/or software that allows the mobile beacon 104 to communicate using any one or more of the following communications protocols including but not limited to Bluetooth®, Bluetooth® Low Energy, Zigbee®, proprietary short range protocols such as the one used in Texas Instruments® CC430, and any other protocol designed for low power, short range wireless communications. The SRCI modem 207 modulates and demodulates signals/data for the SRCI 206, and the SRCI transceiver 208 transmits and receives signals/data for the SRCI 206.

The first communications interface 206 is a communications interface that is able to communicate with the tracking server 108 via underlying network(s) connecting them. For example, the first communications interface 206 may include hardware and/or software that allows the mobile beacon 104 to establish communications with the tracking server 108 via the WWAN 109, where the WWAN 109 may be a cellular telephone/data network. As another example, the first communications interface 206 may include additional hardware and/or software that allows the mobile beacon 104 to connect to a wireless local area network (WLAN). While connected to the WLAN, the mobile beacon 104 may establish communications (transmit and receive messages) with the tracking server 108. Thus, the first communications interface 206 may allow the mobile beacon 104 to communicate with the tracking server 108 via the WWAN 109 and/or a WLAN. The modem 207 modulates and demodulates signals/data for the first communications interface 206, and the transceiver 208 transmits and receives signals/data for the first communications interface 206.

In one aspect of the present disclosure, the home beacon 106 may include the same components as the mobile beacon 104 shown in FIG. 2. However, while the mobile beacon 104 may be battery powered, the home beacon 106 typically derives its power from a mains power source (e.g., wall outlet).

Exemplary Tracking Device

Figure 3:
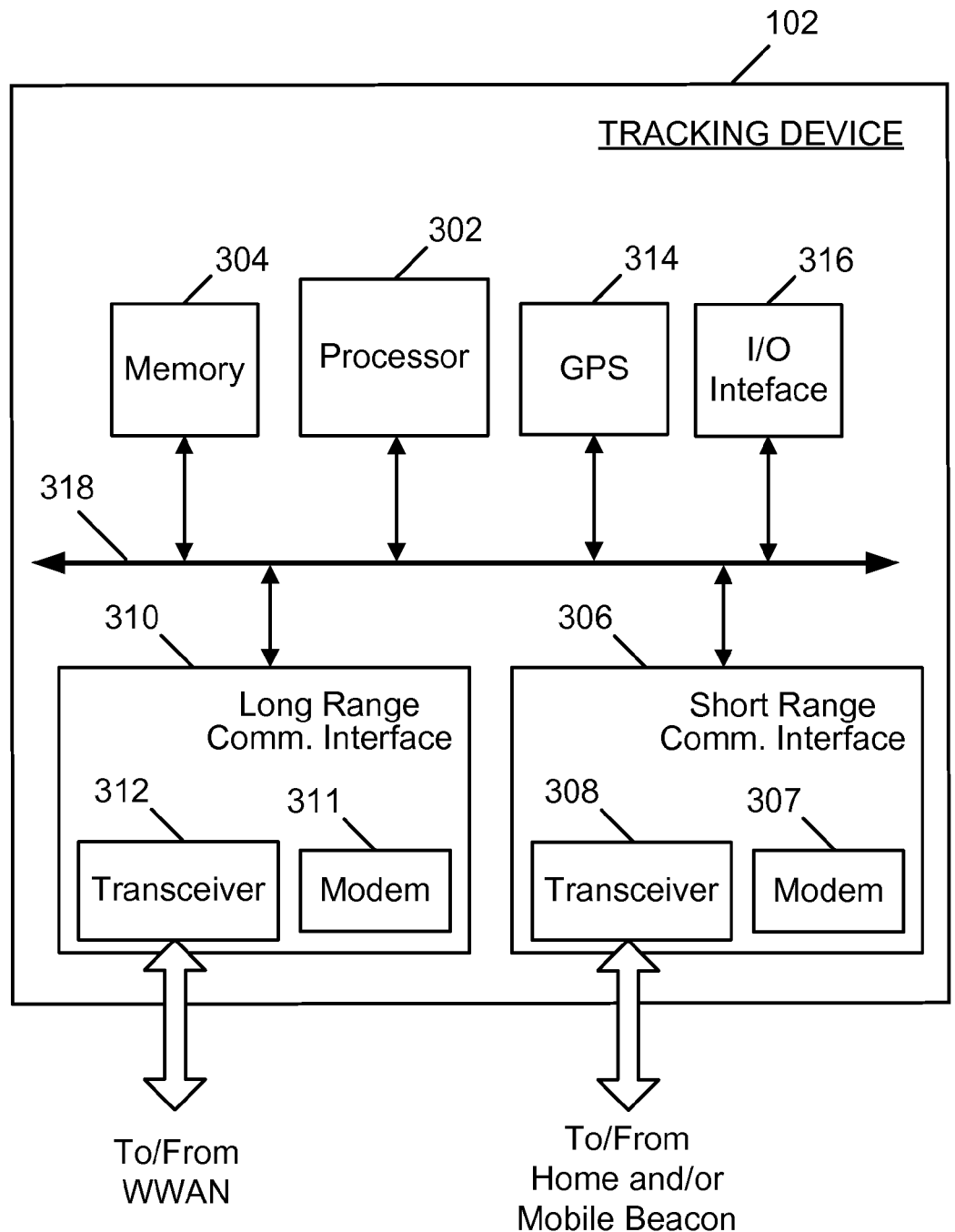
FIG. 3 illustrates a functional block diagram of one example of a tracking device.

FIG. 3 illustrates a functional block diagram of the tracking device 102 according to one aspect of the present disclosure. The tracking device 102 may include a processing circuit (e.g., processor, processing module, etc.) 302, a memory circuit (e.g., memory, memory module, etc.) 304, a short range communications interface (also referred to herein as a "first communications interface") 306, a long range communications interface (also referred to herein as a "second communications interface" and a "WWAN communications interface") 310, a GPS receiver 314, and an input/output (I/O) interface 316. All or some of these components may communicate with one another via a bus 318. The short range communications interface 306 may include, among other components, a short range communications modem 307 and a short range communications transceiver 308. The long range communications interface 310 may include, among other components, a long range communications modem 311 and a long range communications transceiver 312.

The processing circuit 302 is adapted to process data. For example the processing circuit 302 may process data and requests received from, and/or transmitted to, the beacons 104, 106, in addition to processing data and requests received from, and/or transmitted to, the tracking server 108. The memory circuit 304 is adapted to store data. The memory circuit 304 may be volatile memory and/or non-volatile memory, including but not limited to DDR SDRAM, FLASH memory, one time programmable read only memory (ROM), etc. The memory circuit 304 is adapted to store data received from and/or transmitted to the beacons 104, 106 and tracking server 108. The GPS receiver 314 receives global positioning system (GPS) signals from GPS satellites, and determines the location of the tracking device 102. The I/O interface 316 may include a plurality of input devices such as buttons, a touchscreen, USB input connectors, etc., and a plurality of output devices such as speakers, a display, etc.

The short range communications interface (SRCI) 306 is a wireless communications interface that is relatively low power, and limited in range in comparison to, for example, the long range communications interface 310. The SRCI 306 may include hardware and/or software that allows the tracking device 102 to communicate using any one or more of the following communications protocols, including but not limited to, Bluetooth®, Bluetooth® Low Energy, Zigbee®, proprietary short range protocols such as the one used in Texas Instruments® CC430, and any other protocol designed for low power, short range wireless communications. The SRCI modem 307 modulates and demodulates signals/data for the SRCI 306, and the SRCI transceiver 308 transmits and receives signals/data for the SRCI 306.

The long range communications interface (LRCI) 310 is a wireless communications interface that is relatively high power and has a significantly longer range than, for example, the SRCI 306. The LRCI 310 may include hardware and/or software that allows the tracking device 102 to establish communications with the tracking server 108 via the WWAN 109. The LRCI modem 311 modulates and demodulates signals/data for the LRCI 310, and the LRCI transceiver 312 transmits and receives signals/data for the LRCI 310.

Exemplary Tracking Server

Figure 4:
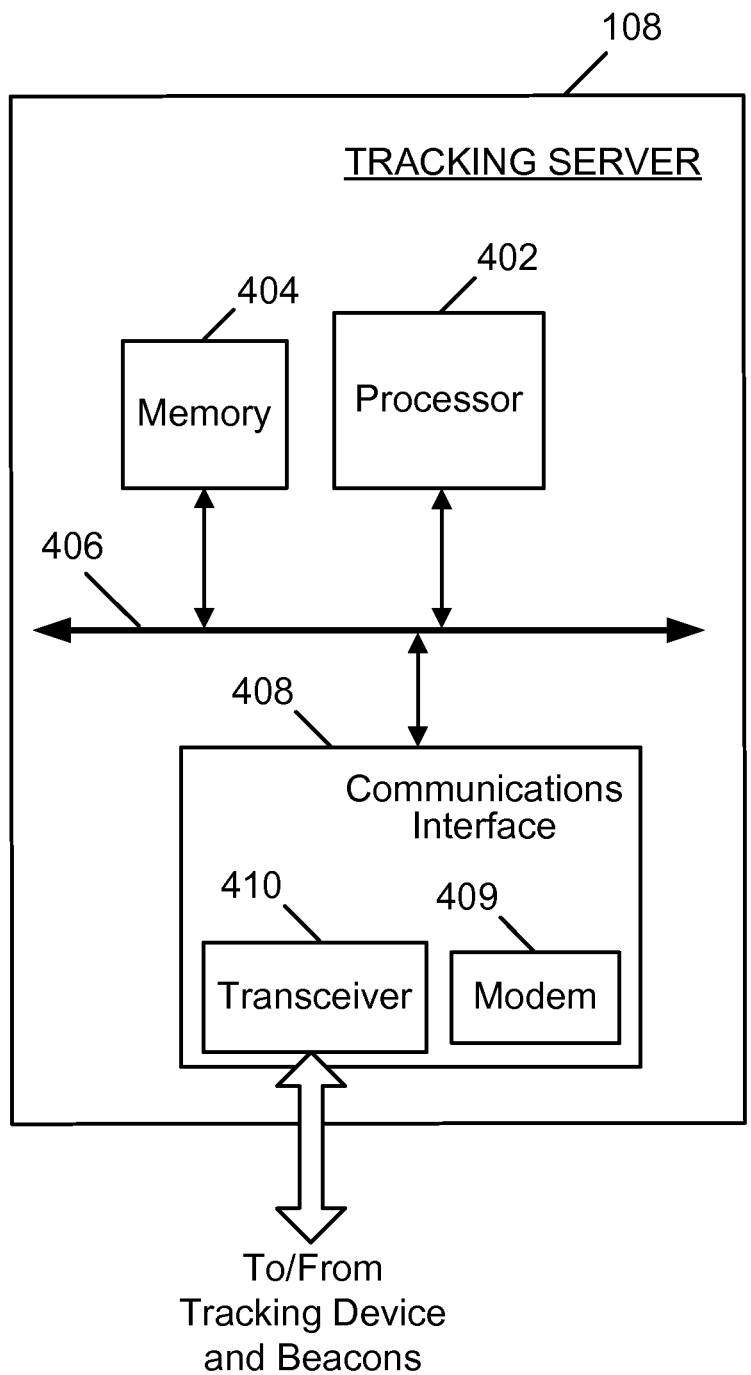
FIG. 4 illustrates a functional block diagram of one example of a tracking server.

FIG. 4 illustrates a functional block diagram of the tracking server 108 according to one aspect of the present disclosure. The tracking server 108 may include a processing circuit (e.g., processor, processing module, etc.) 402, a memory circuit (e.g., memory, memory module, etc.) 404, and a communications interface 408. All or some of these components may communicate with one another via a bus 406. The communications interface 408 may include, among other components, a modem 409 and a transceiver 410.

The processing circuit 402 is adapted to process data. For example the processing circuit 402 may process data and requests received from, and/or transmitted to, the tracking device 102, in addition to processing data and requests received from, and/or transmitted to, the beacons 104, 106. The memory circuit 404 is adapted to store data. The memory circuit 404 may be volatile memory and/or non-volatile memory, including but not limited to DDR SDRAM, FLASH memory, one time programmable read only memory (ROM), etc. The memory circuit 404 is adapted to store data received from and/or transmitted to the tracking device 102 and the beacons 104, 106.

The communications interface 410 may include hardware and/or software that allows the tracking server 108 to connect to the WWAN 109. Thus, the communications interface 410 allows the tracking server 108 to establish communications with the tracking device 102 and the beacons 104, 106 via underlying network(s) that connect them. The communications interface modem 409 modulates and demodulates signals/data, and the communications interface transceiver 410 transmits and receives signals/data.

Exemplary Methods of Communication Between Tracking Device and Beacons

The beacons 104, 106 each define authorized perimeters 110, 112 within which the pet carrying the tracking device 102 is considered to be safe. Short range communications between the beacons 104, 106 and the tracking device 102 determine whether the tracking device 102 is within at least one of the authorized perimeters 110, 112. The beacons 104, 106 and the tracking device 102 may communicate with one another over one or more short range communication links that include, but are not limited to, Bluetooth®, Bluetooth® Low Energy, Zigbee®, proprietary short range protocols such as the one used in Texas Instruments® CC430, and any other protocol designed for low power, short range wireless communications.

Figure 5A:
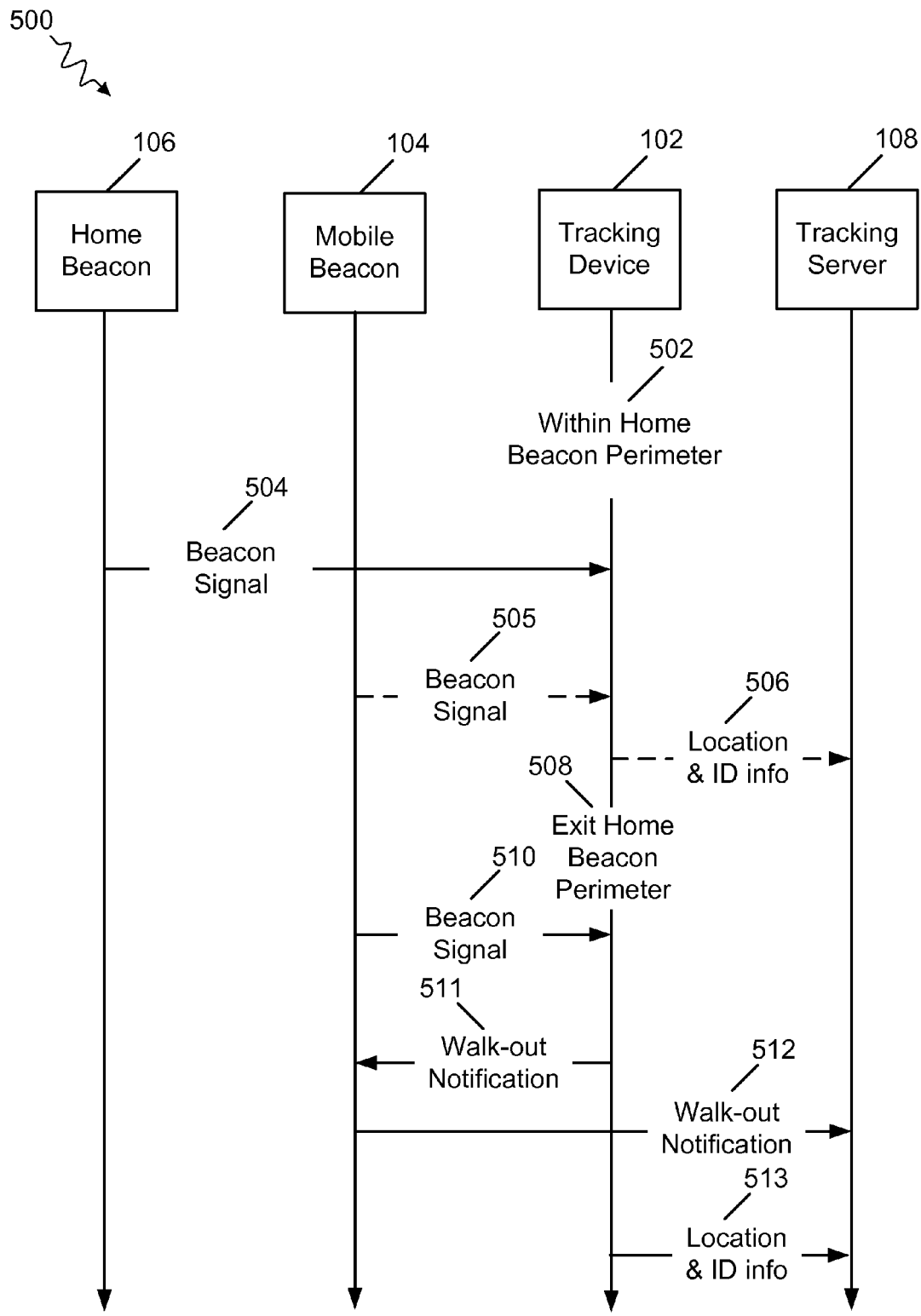
FIGS. 5A and 5B illustrate a process flow diagram for tracking an object.
Figure 5B:
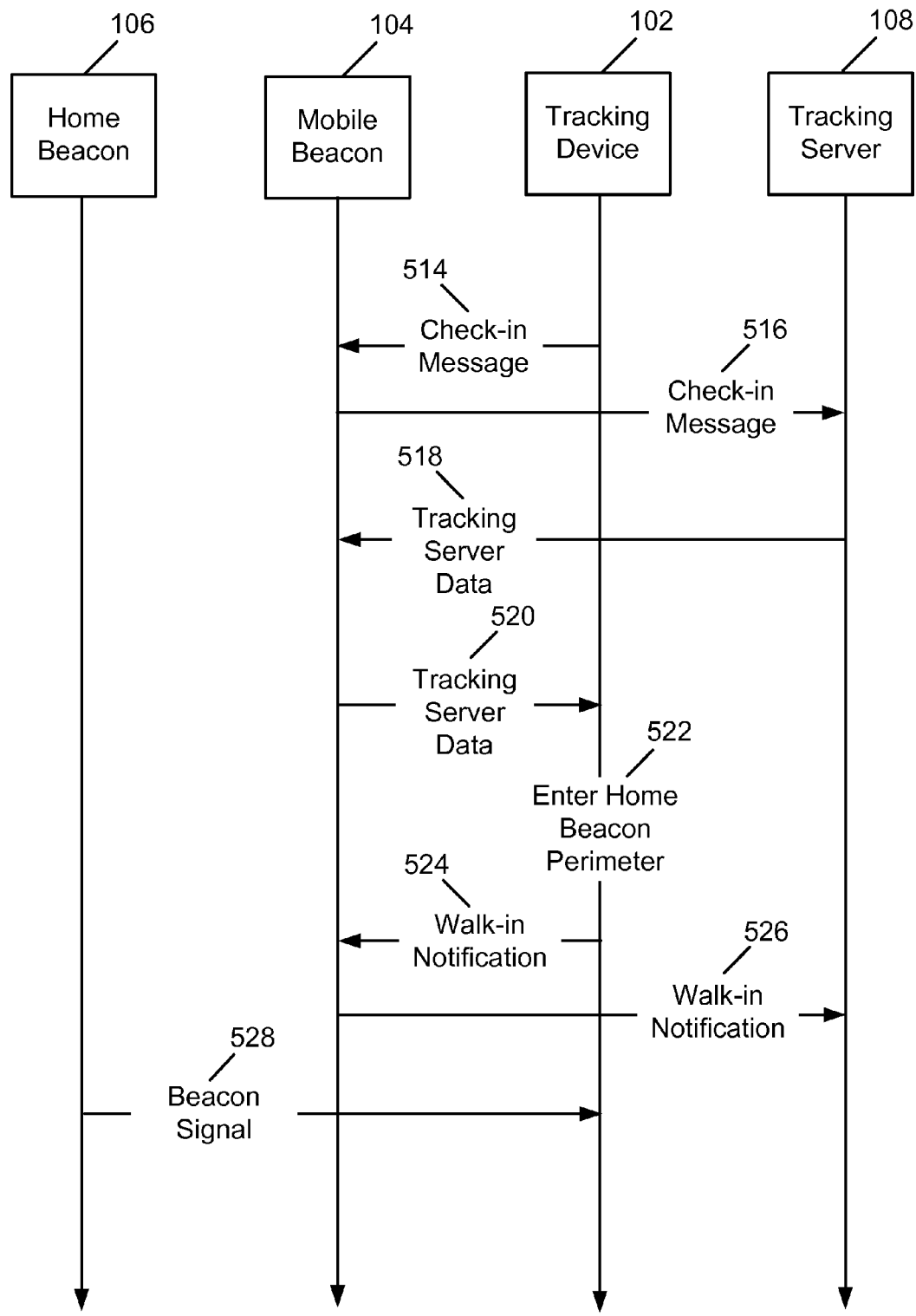

FIGS. 5A and 5B illustrate a process flow diagram 500 for tracking an object according to one aspect of the present disclosure. In this example, the beacons 104, 106 act as advertising devices that actively broadcast beacon signals advertisement protocol data units (herein referred to as "advertisement messages"), and the tracking device 102 acts as a scanning device (i.e., tracking device 102 is in a scanning state/mode) that listens for and attempts to receive the beacon signals from the one or more beacons 104, 106. The beacon signals include address identifier information associated with the beacons 104, 106, and inform the tracking device 102 that it is within range of the beacons 104, 106. Thus, if the tracking device 102 receives beacon signals associated with the home beacon 106, the tracking device 102 may assume that it is within the home beacon's perimeter 110. Similarly, if the tracking device 102 receives beacons signals associated with the mobile beacon 104, the tracking device 102 may assume that it is within the mobile beacon's perimeter 112.

According to one aspect of the disclosure, the beacon signals are Bluetooth® Low Energy advertisement messages. In such a case, the short range communications interface 210 of at least one of the beacons 104, 106 and the short range communications interface 306 of the tracking device 102 are adapted to utilize a Bluetooth® Low Energy communications protocol. The Bluetooth® Low Energy advertisement messages may be a series of periodically transmitted signal pulses having a short duration, for example, 1.5 milliseconds (ms), and the payloads of the advertisement messages may include the beacons' 104, 106 address identifier information along with other advertisement data. The energy expended by transmitting these advertisement messages are relatively low given the relatively short duration of the advertisement messages. However, the beacon signals broadcast by the beacons 104, 106 are not limited to Bluetooth® Low Energy advertisement messages. In other aspects of the disclosure, the beacon signals broadcast by the beacons 104, 106 may be messages associated with other protocols that again serve to inform the tracking device 102 that it is within range of the beacons 104, 106.

Referring to FIG. 5A, at step 502, a pet carrying the tracking device 102 is initially located within the home beacon's perimeter 110. At step 504, the home beacon 106 may broadcast beacon signals that are received by the tracking device 102. The beacon signals received by the tracking device 102 help assure the tracking device 102 that it is within the home beacon's perimeter 110. As long as the tracking device 102 continues to receive the beacon signals from the home beacon 106, the tracking device 102 does not have to contact the tracking server 108 with location information via the WWAN 109, and thereby conserves battery power. However, if the tracking device 102 does not receive the beacon signals from the home beacon 106 for a predetermined period of time, for example because the pet has left the authorized perimeter 110, the tracking device 102 may optionally activate its WWAN communications interface 310 and transmit location and identification (ID) information to the tracking server 108 at step 506. In one aspect of the disclosure, the beacon signals transmitted by the home beacon 106 are Bluetooth® Low Energy advertisement messages. However, the beacon signals broadcast by the home beacon 106 are not limited to Bluetooth® Low Energy advertisement messages. In other aspects of the disclosure, the beacon signals broadcast by the home beacon 106 may be messages associated with other protocols that again serve to inform the tracking device 102 that it is within range of the home beacon 106, such as messages associated with a proprietary short range protocol. Regardless of the protocol used between the home beacon 106 and the tracking device 102, the tracking device 102 may optionally activate its WWAN communications interface 310 and transmit location and identification (ID) information to the tracking server 108 if communications between the home beacon 106 and the tracking device 102 are lost.

Assuming the pet has not already left the perimeter 110, the user may decide to take the pet for a leisurely walk. At step 508, the pet and the attached tracking device 102 leave the perimeter 110 with a user who is carrying the mobile beacon 104. Upon exiting the perimeter 110, the tracking device 102 no longer receives the home beacon's 106 beacon signals. However, since the tracking device 102 leaves the home beacon's perimeter 110 with the user who is carrying the mobile beacon 104, the tracking device 102 is within range of the mobile beacon's perimeter 112. As a result the tracking device 102 may begin receiving beacon signals broadcast by the mobile beacon 104 at step 510. Since the tracking device 102 is within range of the mobile beacon's perimeter 112, it is considered to be in a safe zone and the tracking device 102 does not have to expend energy unnecessarily by contacting the tracking server 108 via its long range communications interface 310. According to one aspect of the disclosure, the tracking device 102 automatically receives the mobile beacon's 104 beacon signals while continuously in a beacon signal scanning state/mode. In another aspect of the disclosure, the tracking device 102 may transition into the beacon signal scanning state/mode after losing the home beacon's 106 beacon signal.

As the user and pet continue their stroll together the tracking device 102 continues to receive beacon signals from the mobile beacon 104. However, if the tracking device 102 does not receive the beacon signals from the mobile beacon 104 for a predetermined period of time, for example because the pet has left the authorized perimeter 112 by wandering away from the user, the tracking device 102 may activate its WWAN communications interface 310 and transmit location and identification (ID) information to the tracking server 108 at step 513. In one aspect of the disclosure, the beacon signals transmitted by the mobile beacon 104 are Bluetooth® Low Energy advertisement messages. However, the beacon signals broadcast by the mobile beacon 104 are not limited to Bluetooth® Low Energy advertisement messages. In other aspects of the disclosure, the beacon signals broadcast by the mobile beacon 104 may be messages associated with other protocols that again serve to inform the tracking device 102 that it is within range of the mobile beacon 104.

In addition to serving as a beacon, the mobile beacon 104 may also serve as a proxy for the tracking device 102. Specifically, the mobile beacon 104 may transmit to and receive data from the tracking server 108 via the WWAN 109 and/or a WLAN on behalf of the tracking device 102. Serving as a proxy for the tracking device in this fashion saves considerable battery life for the tracking device 102 that would ordinarily have to transmit and receive this data itself using its own WWAN interface 310. For example, the tracking device 102 may desire to transmit various types of tracking device data to the tracking server 108, including but not limited to: check-in messages, walk-in notifications, walk-out notifications, location information, and/or ID information. During times where the mobile beacon 104 is serving as a beacon for the tracking device 102, the tracking device 102 may instead transmit these messages, notifications, and information to the mobile beacon 104 using its SRCI 306. The mobile beacon 104 can then use its own first communications interface (e.g., WWAN interface) 206 to transmit this data to the tracking server 108.

Check-in messages are messages that include, at least one or more of the following information: the amount of time the tracking device 102 has been within range of the home beacon 106; the amount of time the tracking device 102 has been within range of a particular mobile beacon; the locations of a particular mobile beacon while the tracking device 102 was in its range; the amount of time it lost communication with any beacon 104, 106, and thus may have been in a dead zone; and the locations of the tracking device 102 while the tracking device 102 lost communication with the beacons 104, 106 (was in a dead zone). The check-in messages may be transmitted periodically, for example, every hour, or once every twenty-four (24) hours, etc. The tracking server 108 may tally check-in messages and generate a report for the user. Walk-out notifications are notifications that indicate that the tracking device 102 is leaving the home perimeter 106 (i.e., the tracking device 102 does not receive the home beacon's beacon signal). Walk-in notifications, by contrast, are notifications that indicate that the tracking device 102 has re-entered the home perimeter 106 (i.e., the tracking device 102 begins to receive the home beacon's beacon signal again).

Referring to FIG. 5B, the tracking device 102 may desire to transmit a check-in message to the tracking server 108. Rather than transmit the check-in message directly to the tracking server 108 using its WWAN communications interface 310, at step 514, the tracking device 108 may transmit the check-in message to the mobile beacon 104 instead. At step 516, the mobile beacon 104 transmits the check-in message received to the tracking server 108 using its first communications interface 206. At step 518, the tracking server 108 may transmit tracking server data to the mobile beacon 104 via the WWAN 109 instead of transmitting this data directly to the tracking device 102. The tracking server data may include, among other things, GPS XTRA data that may have been previously requested by the tracking device 102. At step 520, the mobile beacon 104 may forward this tracking server data to the tracking device 102. In this fashion, the mobile beacon 104 also acts as a proxy for the tracking device 102 by receiving data on its behalf so that the tracking device 102 does not unnecessarily consume batter power by powering up its WWAN communications interface 310.

Next, at step 522, the user and the pet wearing the tracking device 102 may return home after the walk. At step 524, the tracking device 102 may then transmit a walk-in notification to the mobile beacon 104 (and/or the home beacon 106) since the tracking device 102 is now back within the home beacon's perimeter 110. At step 526, the mobile beacon 104 transmits the walk-in notification to the tracking server 108 via its first communications interface 206. At step 528, the tracking device 102 begins to receive the home beacon's 106 beacon signal again. The mobile beacon 104 may stop transmitting the beacon signal. Alternatively, the mobile beacon 104 may continue transmitting the beacon signal, e.g., to help reduce the number or size of any dead zones on the user's property.

Referring to FIG. 5A, in one aspect, the tracking device 102 may receive beacon signals from at least one mobile beacon 104 while the tracking device 102 is still within the home beacon's perimeter 110 at step 505, in addition to the beacon signals received from the home beacon 106. The mobile beacon's 104 beacon signals may include address identifier information identifying the mobile beacon 104. Reception of beacon signals from multiple beacons 14, 106 within the home beacon's perimeter 110 may help reduce the effect of extraneous "dead zone" transmissions by the tracking device 102. Dead zone transmissions are transmissions by the tracking device 102 to the tracking server 108 via the WWAN 109 that occur when the tracking device 102 loses signal contact (e.g., does not receive a beacon signal) from the beacons 104, 106 even though the tracking device 102 is within one of the authorized perimeters 110, 112. This may occur most commonly when obstacles block the signal path of the beacon signals to the tracking device 102. Thus, when the user and her mobile beacon 104 are at home (i.e., within the home beacon's perimeter 110), the tracking device 102 may receive beacon signals from the user's mobile beacon 104 to help reduce the number or size of any dead zones on the user's property.

Additionally, walk-out notifications may also be transmitted by the mobile beacon 104. For example, at step 511, the tracking device 102 may transmit a walk-out notification to the mobile beacon 104 after exiting the home beacon's perimeter 110 (step 508) and receiving the mobile beacon's 104 beacon signal (step 510). Serving as a proxy, the mobile beacon 104 may then transmit the walk-out notification on behalf of the tracking device 102 to the tracking server 108 via its first communications interface 206 at step 512. In another aspect, the home beacon 106 may serve as a proxy for the tracking device 102 while the tracking device 102 is within the home beacon's perimeter 110. That is, the home beacon 106 may transmit tracking device data to the tracking server 108, and similarly, receive tracking server data from the tracking server 108 on behalf of the tracking device 102 via its first communications interface (e.g., WWAN communications interface).

In some aspects of the present disclosure, the tracking device 102 uses a very small amount of power while it is receiving a beacon signal from one or more of the beacons 104, 106. When the tracking device 102 desires to transmit tracking device data to one or more of the beacons 104, 106, it may fully activate its SRCI 306 and establish a full communications session over a short range communications link with the beacon(s) 104, 106. Similarly, a full communications session may be established when one of the beacons 104, 106 desires to transmit tracking server data to the tracking device 102. Power consumption by the tracking device 102 may rise when it has established a full communications session over the short range communications link. However, this level of power consumption is still relatively low compared to long range communications sessions established with the tracking server 108 using its WWAN communications interface 310.

Figure 6A:
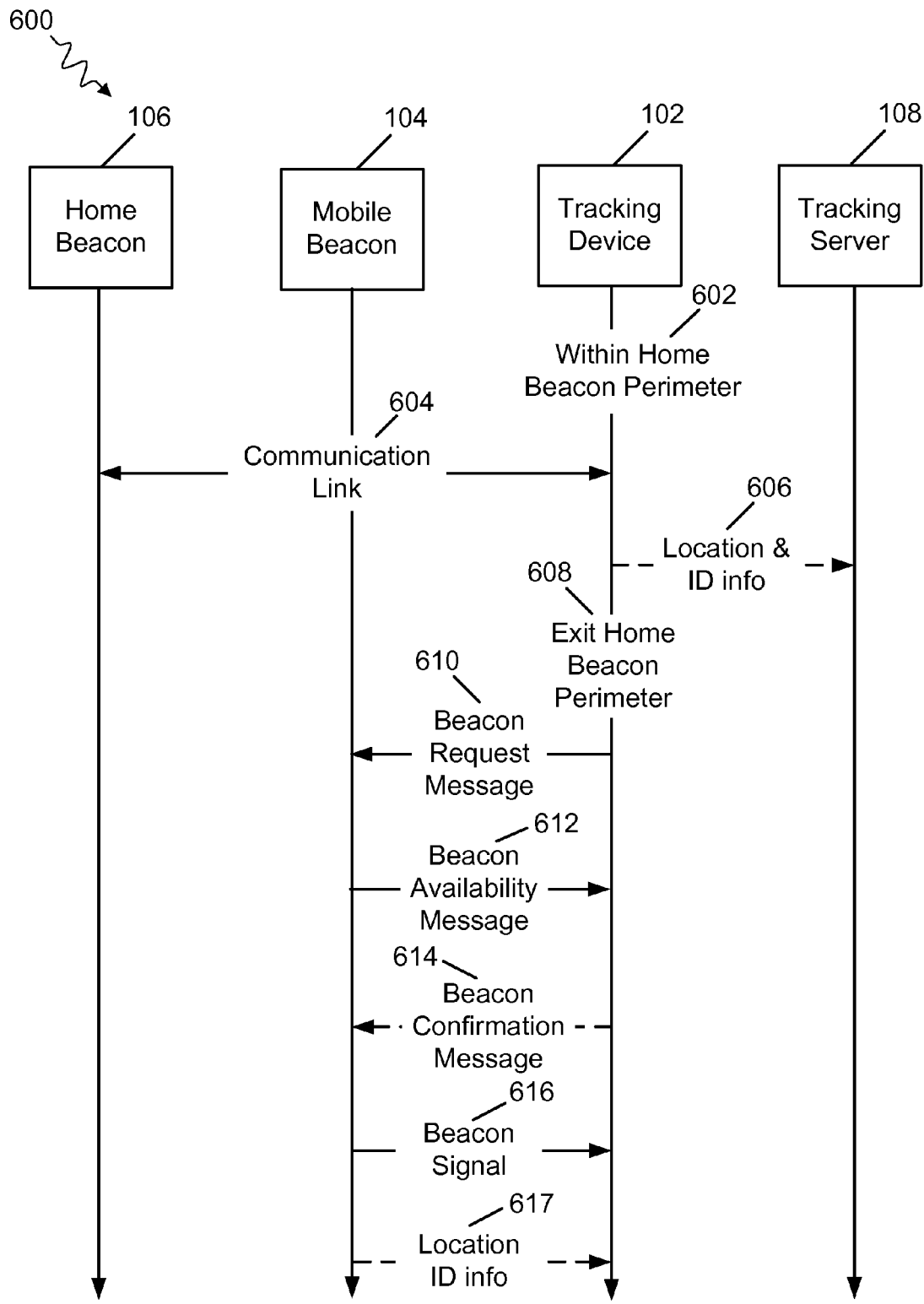
FIGS. 6A and 6B illustrate another process flow diagram for tracking an object.
Figure 6B:
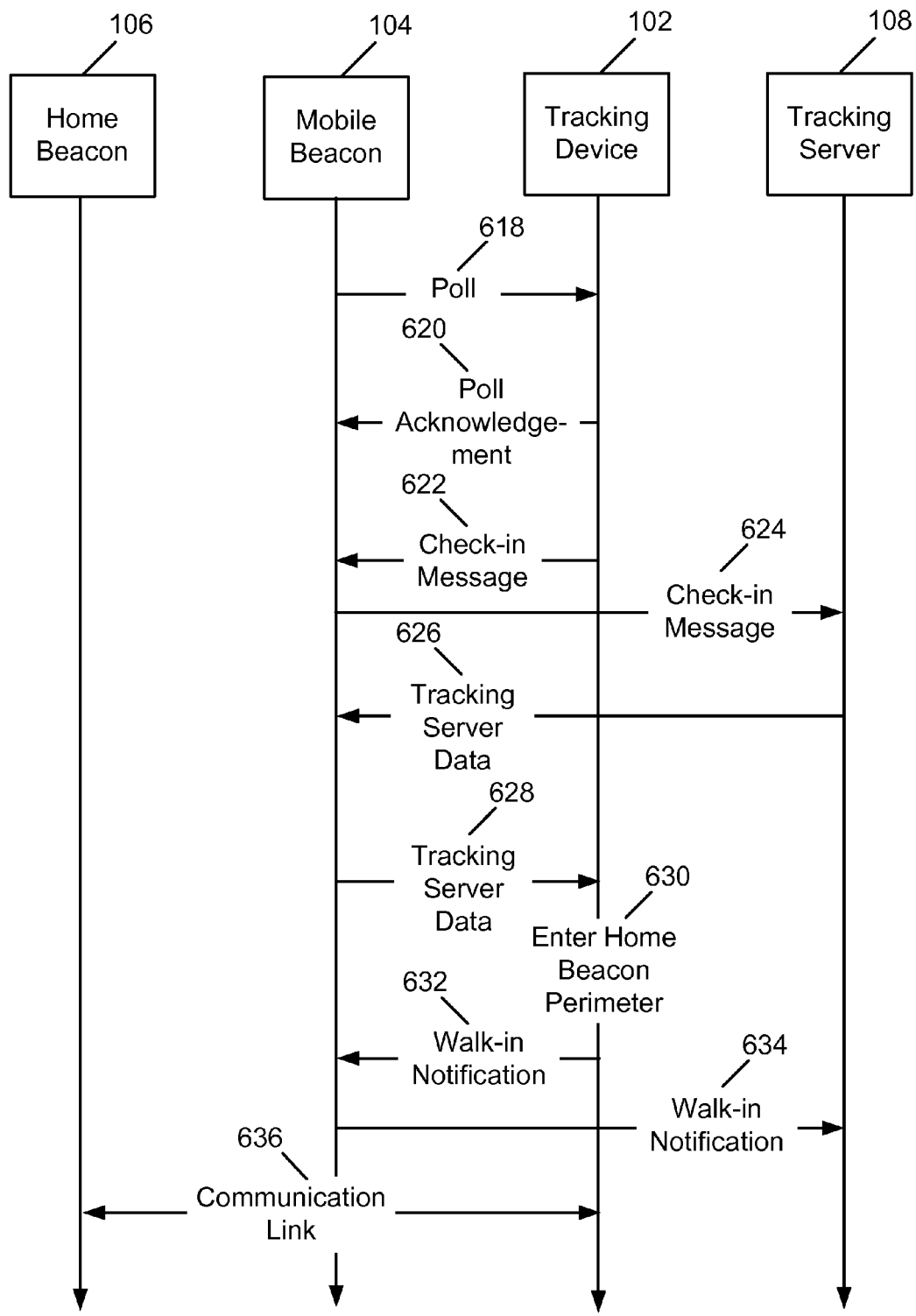

FIGS. 6A and 6B illustrate a process flow diagram 600 for tracking an object according to one aspect of the present disclosure. Referring to FIG. 6A, at step 602, a pet carrying the tracking device 102 is initially located within the home beacon's perimeter 110. At step 604, the home beacon 106 and the tracking device 102 may be in communications with one another via a short range communications link since the tracking device 102 is within range of the home beacon 106. For example, the tracking device 102 may receive beacon signals from the home beacon 106 associated with a Bluetooth® Low Energy protocol or receive other messages associated with another protocol, such as a proprietary short range communications protocol. As long as the tracking device 102 and the home beacon 106 can establish communications with one another, the tracking device 102 does not have to contact the tracking server 108 with location information via the WWAN 109, and thereby conserves battery power. However, if the tracking device 102 cannot establish communications with the home beacon 106 for a predetermined period of time, for example because the pet has left the authorized perimeter 110, the tracking device 102 may optionally activate its WWAN communications interface 310 and transmit location and identification (ID) information to the tracking server 108 at step 606.

Assuming the pet has not already left the perimeter 110, the user may decide to take the pet for a leisurely walk. At step 608, the pet and the attached tracking device 102 exit the perimeter 110 with a user who is carrying the mobile beacon 104. Upon exiting the perimeter 110, the tracking device 102 loses communication with the home beacon 106. Instead of transmitting location and ID information to the tracking server 108 via the WWAN 109, the tracking device 102 may first attempt to verify that it is within range of other authorized beacon. It may do this by attempting to establish short range communications with other beacons within range, such as the mobile beacon 104 that carried by the user.

At step 610, the tracking device 102 may transmit a beacon request message using its short range communications interface (SRCI) 306. According to one aspect of the disclosure, the beacon request message may be a unicast page that is directed to a specific beacon, such as the mobile beacon 104. In this case, the tracking device 102 acts as a paging device that transmits the beacon request page to the mobile beacon 104, and the mobile beacon 104 acts as a scanning device that listens/scans for the beacon request pages. In one aspect, the mobile beacon 104 may continuously scan for beacon request pages.

According to one example, the beacon request page may be a Bluetooth® page. Thus, the short range communications interface 210 of the mobile beacon 104 and the short range communications interface 306 of the tracking device 102 are adapted to utilize a Bluetooth® communications protocol where the tracking device 102 is adapted to perform the Bluetooth® paging operation. The tracking device 102 may have previously associated (e.g., paired) with the mobile beacon 104 and have knowledge of the mobile beacon's 104 address identifier information.

At step 612, the mobile beacon 104 may respond to the beacon request message by transmitting a beacon availability message to the tracking device 102. The beacon availability message informs the tracking device 102 that the mobile beacon 104 is ready, willing, and/or able to act as a mobile beacon 104 for the tracking device 102. In the aspect of the disclosure where the beacon request message transmitted by the tracking device 102 is a unicast page, such as a Bluetooth® page, the beacon availability message may be a unicast response to the page that informs the tracking device 102 that the mobile beacon 104 received the page and is ready to initiate a Bluetooth® connection.

If the tracking device 102 does not receive any beacon availability messages within a predetermined period of time, the tracking device 102 may then activate its long range communications interface 310 and transmit location and ID information to the tracking server 108 via the WWAN 109. For example, if the tracking device 102 does not receive an answer to its Bluetooth® page messages within a predetermined page time-out (e.g., PageTO) period, for example 2.56 seconds or 5.12 seconds, the tracking device 102 may then activate its long range communications interface 310 and transmit location and ID information to the tracking server 108 via the WWAN 109. In some aspects, the tracking device 102 may be associated with multiple beacons. In such cases, the tracking device 102 may transmit page messages to another beacon it is associated with after expiration of the PageTO. For example, the other beacon may be a smartphone of another individual providing care for the pet. The tracking device 102 may continue to page various mobile and/or home beacons with which it is associated with until exhausting a predetermined amount page attempts. Upon expiration of predetermined page attempt limit, the tracking device 102 may then activate its long range communications interface 310 and transmit location and ID information to the tracking server 108 via the WWAN 109.

At step 614, the tracking device 102 may accept the mobile beacon's 104 availability message to serve as a beacon and optionally transmit a beacon confirmation message to the mobile beacon 104. At step 616, the mobile beacon 104 begins to transmit a beacon signal, thereby establishing the mobile beacon perimeter 112. Since the tracking device 102 receives the mobile beacon's 104 beacon signal it assumes the pet is within an authorized, safe area and does not have to contact the tracking server 108 via the WWAN 109 with location and ID information.

In the case where the tracking device 102 and the mobile beacon 104 establish a Bluetooth® connection after the mobile beacon 104 responds to the tracking device's 102 Bluetooth® page, the mobile beacon 104 may become the "master" device and place the "slave" tracking device 102 into a sniff mode. In sniff mode, the tracking device 102 listens/scans for transmissions from the mobile beacon 104 at a reduced rate thereby reducing power consumption of the tracking device 102. For example, the tracking device 102 may listen/scan for null packet transmissions from the mobile beacon 104 that serve as beacon signals. Thus the beacon signals transmitted in step 616 may be null packet transmissions that inform the tracking device 102 that it is still within a safe authorized proximity of the mobile beacon 104. In one aspect, the mobile beacon 104 may transmit its own location and ID information to the tracking device 102 in step 617.

Referring to FIG. 6B, if the mobile beacon 104 desires to know whether the tracking device 102 is still within range (e.g., within the authorized perimeter 112) the mobile beacon 104 may transmit a poll message to the tracking device 102 in step 618. In response, in step 620 the tracking device 102 transmits a poll acknowledgement message to the mobile beacon 104 that informs the mobile beacon 104 that it is still within range. Poll messages may be transmitted, for example, every other sniff cycle. As just one example, a 1.28 ms sniff cycle may be used.

As the user and pet continue their stroll together, the mobile beacon 104 may also serve as a proxy for the tracking device. Specifically, the mobile beacon 104 may transmit to and receive data from the tracking server 108 via the WWAN 109 and/or a WLAN on behalf of the tracking device 102. For example, the tracking device 102 may desire to transmit various types of tracking device data to the tracking server 108, including but not limited to: check-in messages, walk-in notifications, walk-out notifications, location information, and/or ID information. During times where the mobile beacon 104 is serving as a beacon for the tracking device 102, the tracking device 102 may instead transmit these messages, notifications, and information to the mobile beacon 104 using its SRCI 306. The mobile beacon 104 can then use its own first communications interface (e.g., WWAN interface) 206 to transmit this data to the tracking server 108.

For example, the tracking device 102 may desire to transmit a check-in message to the tracking server 108. Rather than transmit the check-in message directly to the tracking server 108 using its WWAN communications interface 310, at step 622, the tracking device 108 may transmit the check-in message to the mobile beacon 104 instead. At step 624, the mobile beacon 104 transmits the check-in message received to the tracking server 108 using its first communications interface 206. At step 626, the tracking server 108 may transmit tracking server data to the mobile beacon 104 via the WWAN 109 instead of transmitting this data directly to the tracking device 102. The tracking server data may include, among other things, GPS XTRA data that may have been previously requested by the tracking device 102. At step 628, the mobile beacon 104 may forward this tracking server data to the tracking device 102. At step 630, the user and the pet wearing the tracking device 102 may return home after the walk. At step 632, the tracking device 102 may transmit a walk-in notification to the mobile beacon 104 (and/or the home beacon 106) since the tracking device 102 is now back within the home beacon's perimeter 110. At step 634, the mobile beacon 104 transmits the walk-in notification to the tracking server 108 via its first communications interface 206. In this fashion, the mobile beacon 104 also acts as a proxy for the tracking device 102 by receiving and transmitting data on its behalf so that the tracking device 102 does not unnecessarily consume batter power by powering up its WWAN communications interface 310. At step 636, the tracking device 102 and the home beacon 106 may again establish a short range communications link with one another since the tracking device 102 is now back within the home beacon's perimeter 110.

According to one aspect of the disclosure, the beacon request messages may be multicast messages that are broadcast by the tracking device 102 to one or more beacons, including mobile beacon 104. In such a case, the beacon request message pings any and all beacons within range of the tracking device 102 as to whether the beacons are available to act as a beacon for the tracking device 102. The beacon request message may include the identity of the tracking device 102. In one example, the mobile beacon 104 may respond to the beacon request message by transmitting a beacon availability message to the tracking device 102. The beacon availability message informs the tracking device 102 that the mobile beacon 104 is ready, willing, and/or able to act as a mobile beacon 104 for the tracking device 102. Among other things, the beacon availability message includes the identity of the mobile beacon 104. The tracking device 102 may then choose to accept the mobile beacon to serve as a beacon and transmit a beacon confirmation message to the mobile beacon 104. If the mobile beacon 104 receives the beacon confirmation message it begins to transmit its beacon signal, thereby establishing the mobile beacon perimeter 112.

Beacon Handoff Using a Rule Set

Figure 7:
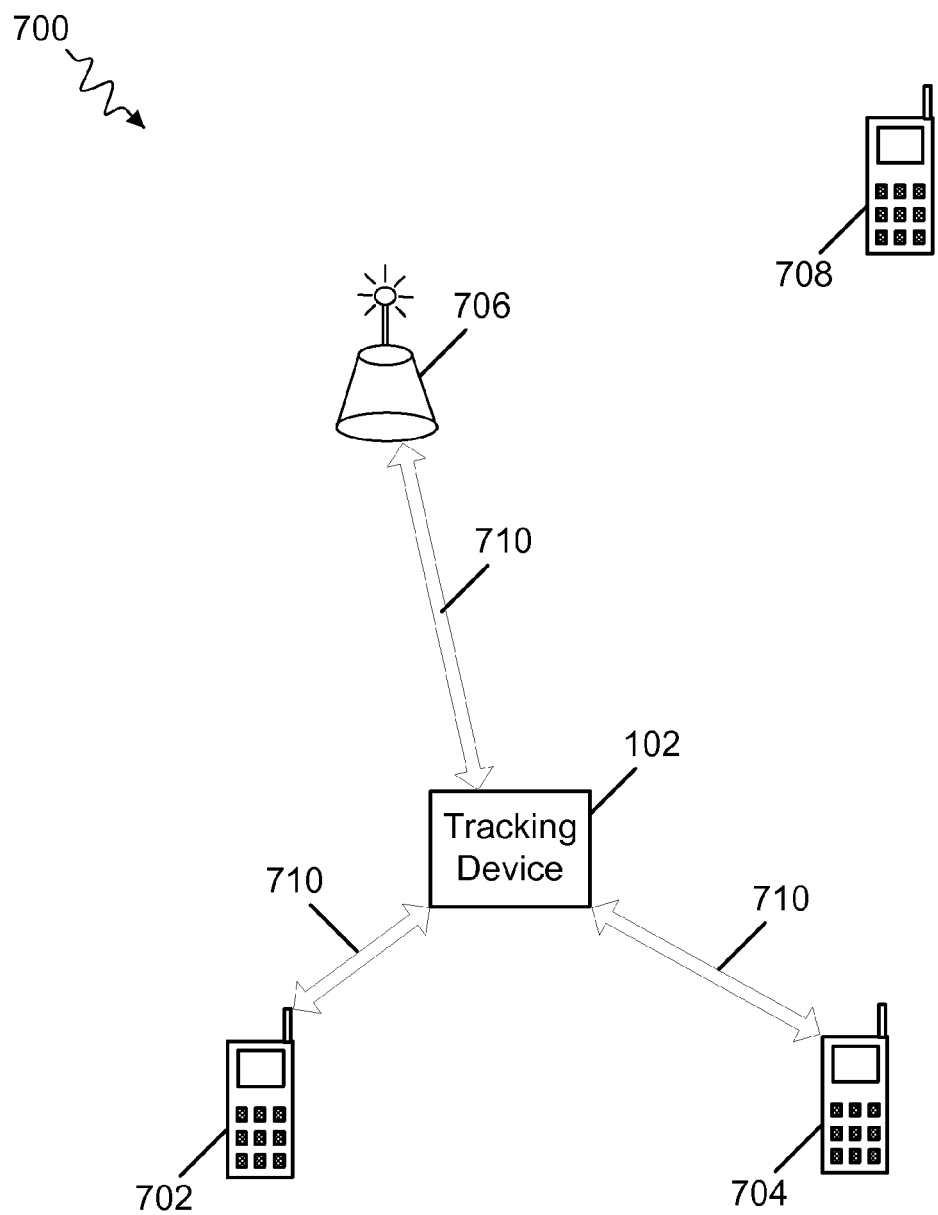
FIG. 7 illustrates a functional diagram of a tracking system featuring a tracking device and a plurality of beacons.

FIG. 7 illustrates a functional diagram of a tracking system 700 featuring a tracking device 102 and a plurality of beacons 702, 704, 706, 708 according to one aspect of the present disclosure. The beacons 702, 704, 706, 708 may have the same components as the mobile beacon 104 shown in FIG. 2. As shown in FIG. 7, the tracking device 102 may be in range with some of the beacons 702, 704, 706 to establish a short range communications link 710. Three of the beacons 702, 704, 708 may be mobile beacons, one may be a home/fixed beacon 706, and one of the beacons 708 may be out of the short range communications range of the tracking device 102.

The beacons 702, 704, 706 and the tracking device 102 may communicate with one another over one or more short range communication links 710 that include but are not limited to Bluetooth®, Bluetooth® Low Energy, Zigbee®, proprietary short range protocols such as the one used in Texas Instruments® CC430, and any other protocol designed for low power, short range wireless communications. For example, the first mobile beacon 702 may be equipped with a Bluetooth® communications interface, the second mobile beacon 704 may be equipped with a Bluetooth® Low Energy communications interface, and the third beacon 706 may be equipped with a Zigbee® communications interface. Thus, a plurality of beacons 702, 704, 706 may each have the same or different short range communications interfaces.

In the example shown in FIG. 7, it may be assumed that the tracking device 102 has either lost an existing connection to a beacon (e.g., beacon 708), or its existing connection is weak (e.g., below a predetermined signal to noise ratio) and it desires to establish a stronger/more powerful connection with another beacon (i.e., handoff communications from one beacon to another). Since there are a plurality of beacons 702, 704, 706 within the vicinity of the tracking device 102, the tracking device may use a rule set in determining which of the mobile beacons to associate with (e.g., receive a beacon signal from, transmit tracking device data to for proxy services). The rule set may be stored in its memory circuit 304.

Figure 8:
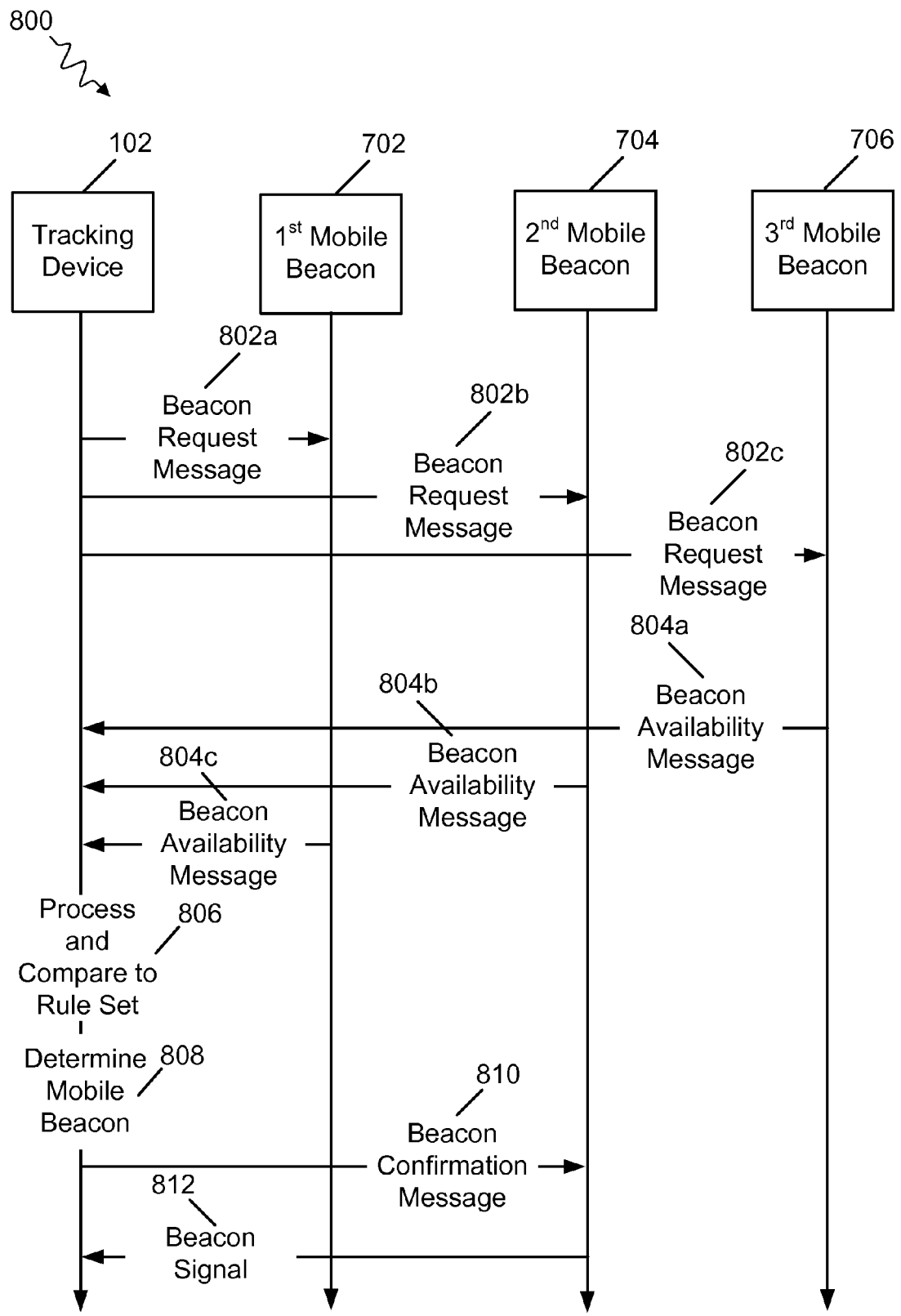

FIG. 8 illustrates a process flow diagram 800 according to one aspect of the present disclosure where a tracking device 102 uses a rule set to determine which of a plurality of beacons to associate with (e.g., which beacon will serve as a proxy). At steps 802a, 802b, 802c, the tracking device 102 broadcasts a beacon request message to the plurality of beacons 702, 704, 706. Since the first mobile beacon 702, the second mobile beacon 704, and the third fixed beacon 706 are within range of the beacon request message, at steps 804a, 804b, 804c they each respond with a beacon availability message. If one of the beacons 702, 704, 706 is unavailable (e.g., its SRCI is already in use with another application) then that beacon may not respond, or it may attempt to transmit an unavailable message.

The mobile beacon availability message may include various data. For example, it may include a unique identifier value associated with the mobile beacon. It may also include any one or more of the following: the type(s) of SRCI the mobile beacon is equipped with; the type(s) of communications interface it uses to communicate with the tracking server 108; a battery life remaining value for the mobile beacon; a signal to noise ratio metric value associated with the short range communications link between the mobile beacon and the tracking device 102; a signal to noise ratio metric value associated with the long range communications link between the mobile beacon and the tracking sever 108; whether the beacon is mobile or fixed; the communications status of the beacon (i.e., whether it's engaged in a call, data transfer, or SRCL with another application); the energy efficiency of the beacon; and other signal quality metrics associated with the short range communications links 710.

The rule set stored on the tracking device 102 sets out the formulas the tracking device 102 uses to calculate the best/most appropriate beacon to serve as a proxy, and transmit beacon signals for the tracking device 102. Thus, the tracking device 102 ranks the plurality of beacons by applying a rule set to the information contained in the received beacon availability messages, and the ranking may determine an order of beacons with which the tracking device may associate with. For example, the rule set may first eliminate those beacons reporting an SRCI 210 that uses a particular SRCL that the tracking device 102 does not wish to utilize at that time. As another example, it may then apply weighting factors to some of the parameters reported including, but not limited to, the energy efficiency of the SRCL, signal to noise ratio of the SRCL; and battery life remaining for the beacon if it is a mobile beacon. Based on this data the rule set assists the tracking device 102 in making a decision as to which beacon to select.

At step 806, the tracking device 102 processes the information received in the beacon availability messages using its rule set. At step 808, the tracking device 102 determines which of the available beacons 702, 704, 706 may be the most appropriate to associate with and have serve as a proxy beacon that transmits a beacon signal to the tracking device 102. In this example, the second mobile beacon's 704 availability message indicates that it has a Bluetooth® Low Energy SRCI 310, and that the SRCL with the tracking device 102 has a higher signal to noise ratio (SNR) than the other two beacons 702, 706. Thus, at step 810, the tracking device 102 transmits a beacon confirmation message to the second mobile beacon 704 informing the second mobile beacon 704 to transmit its beacon signal and serve as a proxy for the tracking device 102. At step 812, the second mobile beacon begins transmitting its beacon signal to the tracking device 102.

Using Intermediary Devices to Relay Data Between Tracking Devices and Beacons

In one aspect of the disclosure, intermediate devices may be used to relay messages and data between the tracking device 102 and the beacons 104, 106. For example, this may be useful when the tracking device 102 is out of range of the beacons 104, 106 (e.g., the tracking device 102 may be in a dead zone), and/or the short range communications interfaces of the tracking device 102 and the beacons 104, 106 are incompatible with one another (e.g., they use different communications protocols and/or bands).

Figure 9:
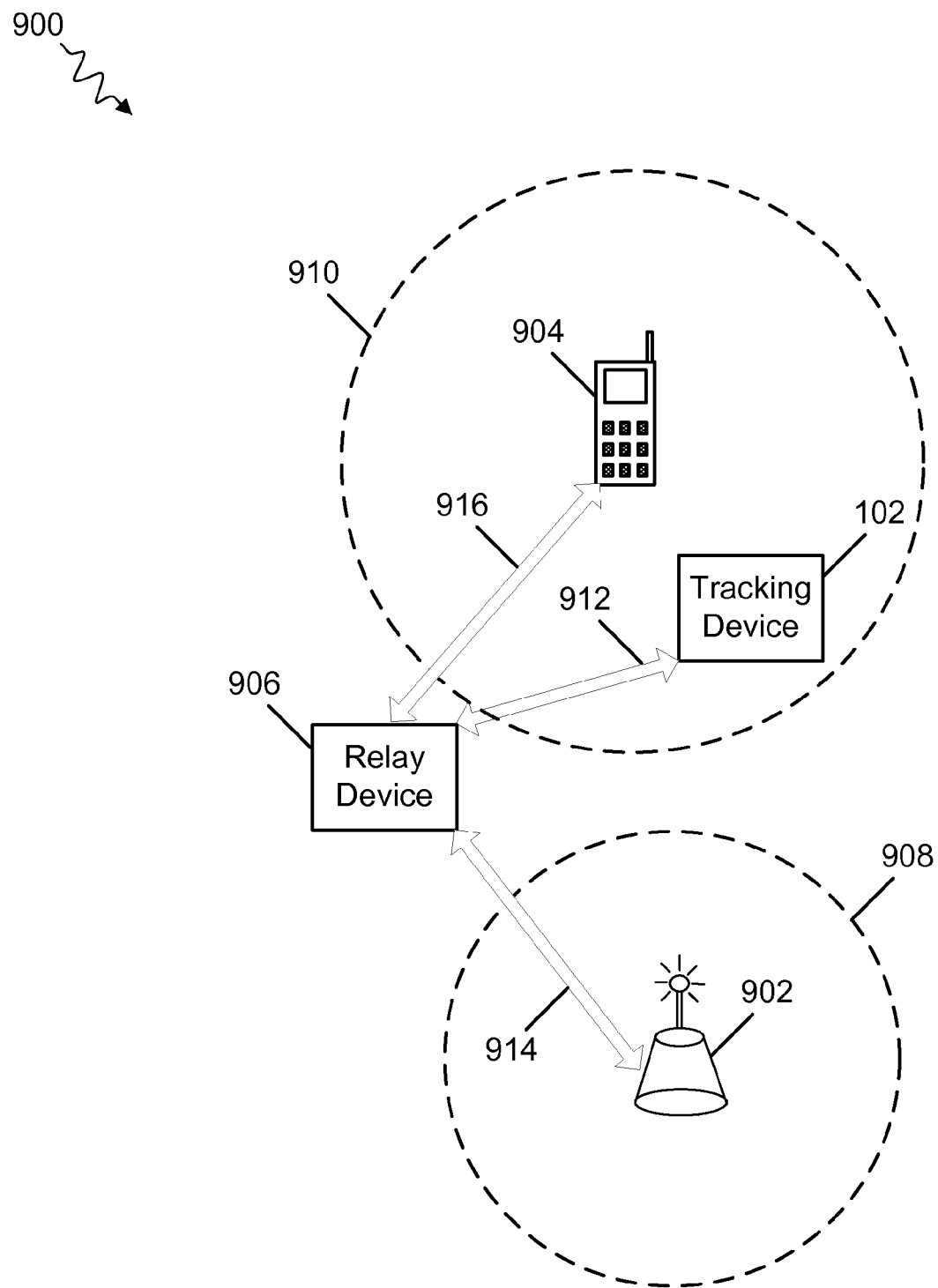
FIG. 9 illustrates a functional diagram of a tracking system featuring a relay device, tracking device, and a plurality of beacons.

FIG. 9 illustrates a functional diagram of a tracking system 900 featuring a tracking device 102, a home beacon 902, a mobile beacon 904, and a relay device 906. The beacons 902, 904 may have the same components as the mobile beacon 104 shown in FIG. 2. The home beacon 902 may transmit beacon signals within a certain geographic perimeter 908, while the mobile beacon 904 may transmit beacon signals within a different geographic perimeter 910. In the example shown in FIG. 9, the tracking device 102 may be located outside the home beacon's perimeter 908, and is thus out of range of the home beacon's 902 beacon signals. Moreover, although the tracking device 102 is within range of the mobile beacon's 904 beacon signals, in this example the two devices 102, 904 cannot directly communicate with each other because the two devices 102, 904 do not share common or otherwise compatible short range communications interfaces. For example, the mobile beacon 904 may have an SRCI that uses a proprietary communications protocol that the tracking device 102 lacks.

The relay device 906 may be any wireless communication device that is capable of establishing a peer to peer (P2P) connection with another electronic device. For example, the relay device 906 may support Alljoyn®, which enables ad-hoc, proximity based, device-to-device communication without the use of an intermediary server. Of course, any other peer to peer communication protocol/standard may be used that allows for ad-hoc device-to-device communication without the need of an intermediary server. As an example, the relay device 906 may be a mobile phone, a laptop, a printer, etc. that includes hardware and/or software to support such P2P connectivity.

In the example shown in FIG. 9, the tracking device 102 may desire to indirectly transmit to and receive data from the beacons 902, 904 by using the relay device 906 as an intermediary. This data may include, for example, transmitting beacon request messages and check-in messages, and receiving beacon availability messages and tracking server data. In addition to the relay device 906, the tracking server 102 and the beacons 902, 904 may also be equipped with hardware and/or software to allow them to establish ad-hoc, proximity based, device-to-device communication without the use of an intermediary server, such as, but not limited to, Alljoyn®. In this example, the relay device 906 has established such a P2P connections 912, 914, 916 with the tracking device 102 and the beacons 904, 906.

Data may now be indirectly transmitted from the tracking device 102 to the mobile beacon 904 via the relay device 906 using the P2P connections 912, 916 even though the tracking device 102 and the mobile beacon 904 cannot directly communicate with each other using their short range communications interfaces. For example, the tracking device 102 may transmit a check-in message to the mobile beacon 904 using the P2P connections 912, 916. In this case, the check-in message may be internet protocol (IP) or higher layer packets that are delivered to the mobile beacon 904 through an underlying transport layer supported by the devices 102, 904, 906. Similarly, the tracking device 102 may receive data from the mobile beacon 904 and the home beacon 902, and transmit data to the home beacon 902 using the P2P connections 912, 914, 916.

Method For Tracking Operational at a Beacon

Figure 10:
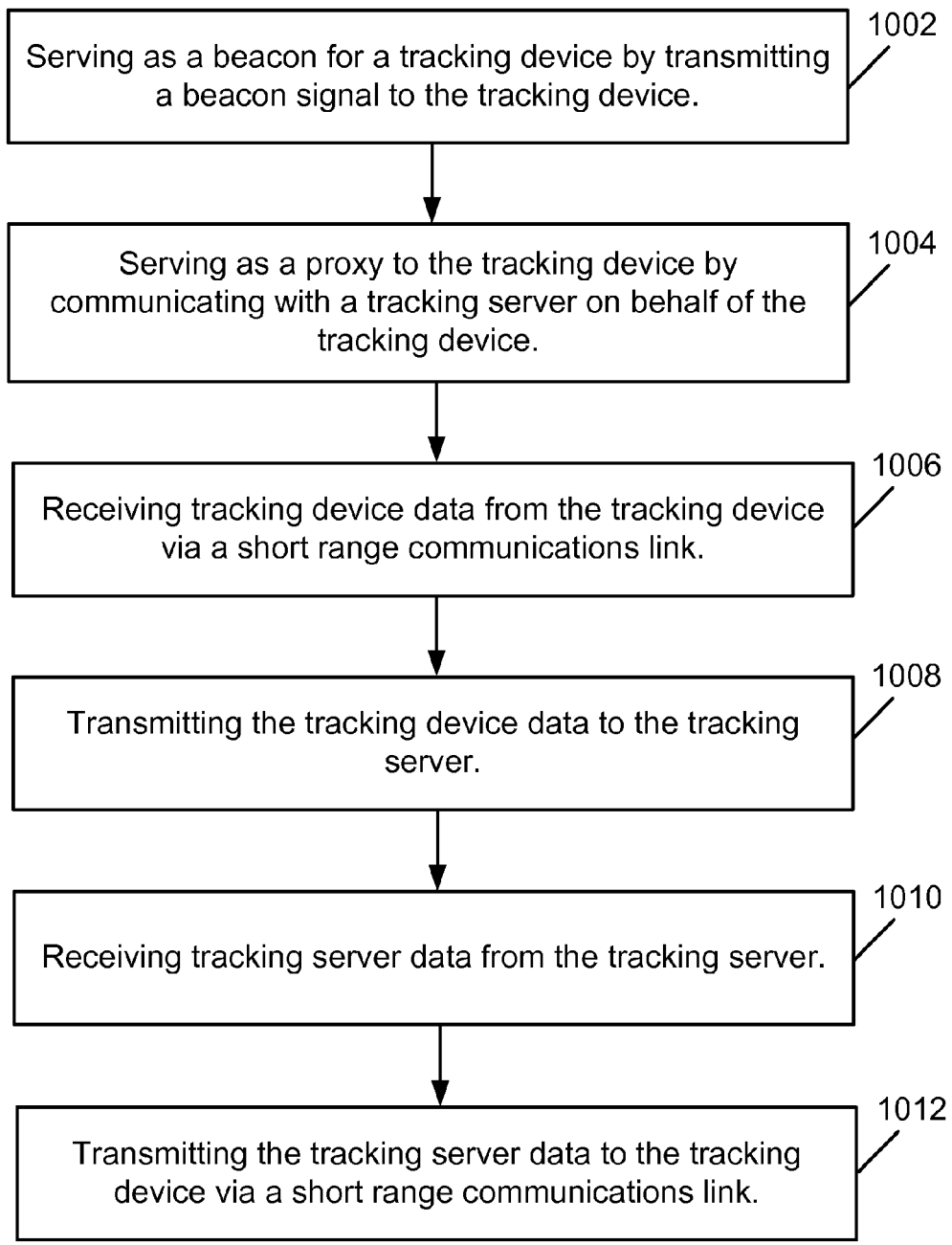
FIG. 10 illustrates a method operational at a wireless communication device, such as a beacon, for tracking.

FIG. 10 illustrates a method operational at a wireless communication device, such as a beacon, for tracking according to one aspect of the present disclosure. At step 1002, the wireless device may serve as a beacon for a tracking device by transmitting a beacon signal to the tracking device. At step 1004, the wireless communication device may serve as a proxy to the tracking device by communicating with a tracking server on behalf of the tracking device. At step 1006, the wireless communication device may receive tracking device data from the tracking device via a short range communications link. At step 1008, the wireless communication device may transmit the tracking device data to the tracking server. At step 1010, the wireless communication device may receive tracking server data from the tracking server. At step 1012, the wireless communication device may transmit the tracking server data to the tracking device via a short range communications link.

Method for Tracking Operational at a Tracking Device

Figure 11:
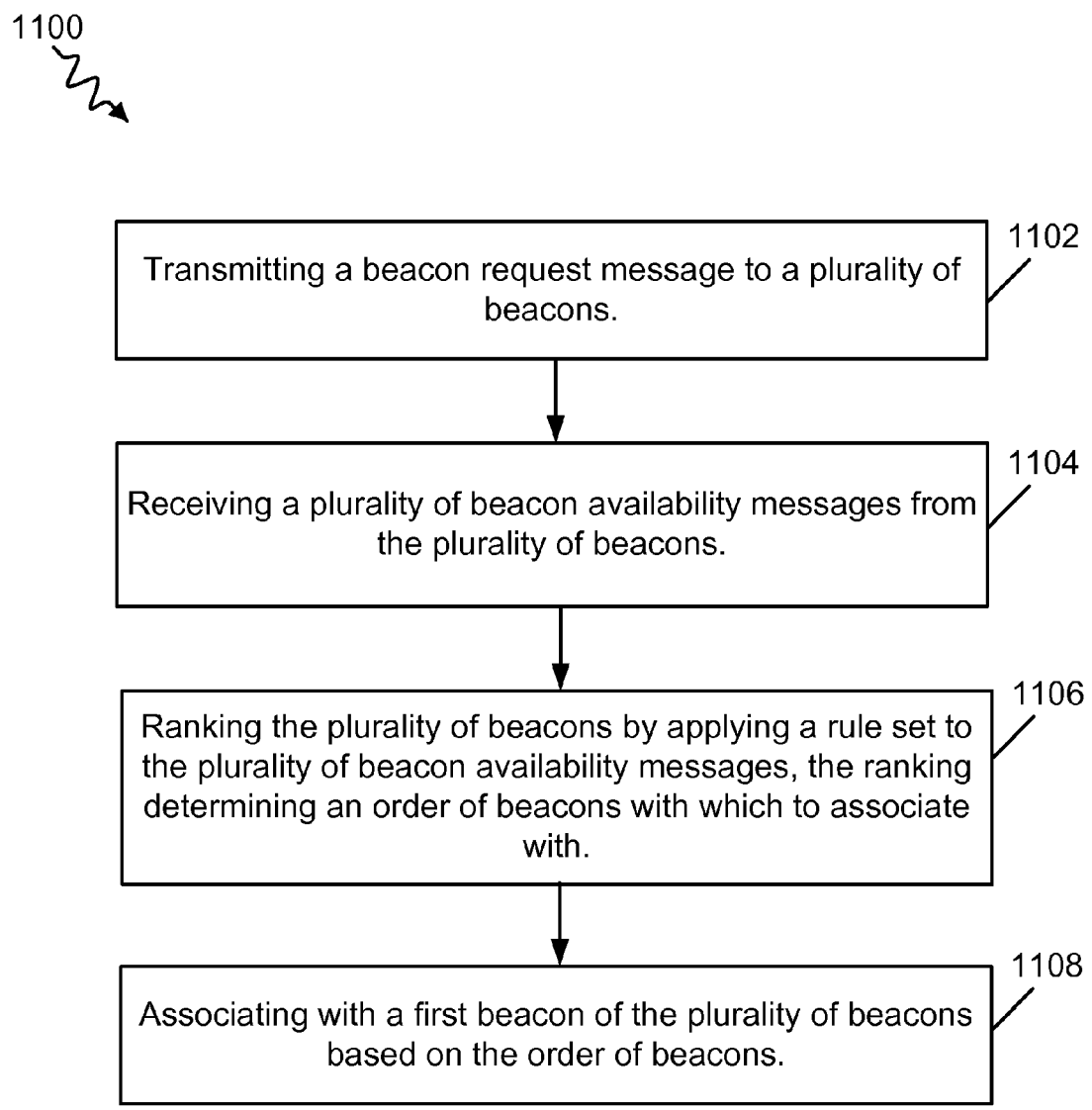
FIG. 11 illustrates a method operational at a tracking device for tracking.

FIG. 11 illustrates a method operational at a tracking device for tracking according to one aspect of the present disclosure. At step 1102, the tracking device may transmit a beacon request message to a plurality of beacons. At step 1104, the tracking device may receive a plurality of beacon availability messages from the plurality of beacons. At step 1106, the tracking device may rank the plurality of beacons by applying a rule set to the plurality of beacon availability messages, the ranking determining an order of beacons with which to associate with. At step 1108, the tracking device may associate with a first beacon of the plurality of beacons based on the order of beacons.

In another aspect of the present disclosure, the tracking device 102 may only turn on the receiver of its WWAN communications interface 310 when it fails to receive a beacon signal. In such a receive-only mode, the tracking device 102 may receive data/messages from the tracking server 108 via the WWAN without expending more battery power than it needs to since the transmitter portion of its WWAN communications interface 310 would remain powered off. If after some predetermined period of time without receiving either a beacon signal or a message over the WWAN, the tracking device 102 may turn on the WWAN communications interface's 310 transmitter as well and transmit location and ID information to the tracking server 108.

One or more of the components, steps, features and/or functions illustrated in FIGS. 1, 2, 3, 4, 5A, 5B, 6A, 6B, 7, 8, 9, 10 and/or 11 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, 7 and/or 9 may be configured to perform one or more of the methods, features, or steps described in FIGS. 5A, 5B, 6A, 6B, 8, 10, and/or 11. The algorithms described herein may also be efficiently implemented in software and/or embedded in hardware.

Moreover, in one aspect of the disclosure, the processing circuit 202 illustrated in FIG. 2 may be a specialized processor (e.g., ASIC) that is specifically designed to perform the algorithms, methods, and/or steps described in FIGS. 5A, 5B, 6A, 6B, 8, and 11. The memory circuit 204 may also store processor 204 readable instructions that when executed by the specialized processor 202 causes the processor 202 to perform the algorithms, methods, and/or steps described in FIGS. 5A, 5B, 6A, 6B, 8, and 11. In another aspect of the disclosure, the processing circuit 302 illustrated in FIG. 3 may be a specialized processor (e.g., ASIC) that is specifically designed to perform the algorithms, methods, and/or steps described in FIGS. 5A, 5B, 6A, 6B, 8, and 10. The memory circuit 304 may also store processor 304 readable instructions that when executed by the specialized processor 302 causes the processor 302 to perform the algorithms, methods, and/or steps described in FIGS. 5A, 5B, 6A, 6B, 8, and 10.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a wireless communication device for tracking, comprising:
    serving as a beacon for a tracking device by transmitting a beacon signal to the tracking device, the tracking device having a long range communication interface configured to communicate with a tracking server; and
    serving as a proxy to the tracking device by communicating with the tracking server on behalf of the tracking device after the tracking device loses communication with a home beacon associated with the tracking device, and serving as the proxy to the tracking device includes
        receiving tracking server data from the tracking server and transmitting the tracking server data to the tracking device via a short range communications link instead of the tracking server data being received at the tracking device directly from the tracking server via the long range communication interface.

2. The method of claim 1, wherein serving as the proxy to the tracking device further includes:
    receiving tracking device data from the tracking device via the short range communications link.

3. The method of claim 2, wherein serving as the proxy to the tracking device further includes:
    transmitting the tracking device data to the tracking server.

4. The method of claim 3, wherein the tracking device data comprises at least one of a check-in message, a walk-in message, a walk-out message, and/or a location information.

5. The method of claim 3, wherein the tracking device data includes at least one of: (a) data pertaining to an amount of time the tracking device has been within communication range of the home beacon; (b) data pertaining to an amount of time the tracking device lost communication with the home beacon; and/or (c) location information of the tracking device at a time where the tracking device lost communication with the home beacon.

6. The method of claim 3, wherein the tracking device data includes walk-out notifications that indicate that the tracking device has lost communication with the home beacon.

7. The method of claim 6, wherein the tracking device data further includes walk-in notifications that indicate that the tracking device has re-established communication with the home beacon.

8. The method of claim 1, wherein serving as the proxy to the tracking device by communicating with the tracking server on behalf of the tracking device comprises:
    communicating with the tracking server via a wireless wide area network (WWAN).

9. The method of claim 1, wherein serving as the proxy to the tracking device by communicating with the tracking server on behalf of the tracking device comprises:
    communicating with the tracking server via a wireless local area network (WLAN).

10. The method of claim 1, further comprising:
    receiving a beacon request message from the tracking device.

11. The method of claim 10, further comprising:
    transmitting a beacon availability message to the tracking device; and
    receiving a beacon confirmation message from the tracking device.

12. The method of claim 11, wherein the beacon availability message comprises at least one of energy efficiency information and/or signal to noise ratio (SNR) information of the wireless communication device.

13. The method of claim 1, further comprising:
    receiving a unicast beacon request page from the tracking device; and
    establishing a short range communications link with the tracking device.

14. The method of claim 1, wherein the beacon signal transmitted to the tracking device supplements another beacon signal associated with another beacon.

15. The method of claim 1, further comprising:
receiving tracking device data associated with the tracking device from a relay device via a peer to peer (P2P) connection.

16. The method of claim 1, further comprising:
receiving a request from the tracking device to obtain the tracking server data via the short range communications link;
transmitting the request to the tracking server for the tracking server data via a first communications interface;
receiving the tracking server data from the tracking server via the first communications interface; and
transmitting the tracking server data to the tracking device via the short range communications link.

17. The method of claim 16, wherein the tracking server data comprises global positioning system (GPS) XTRA data.

18. A wireless communication device, comprising:
a short range communications interface adapted to wirelessly communicate with a tracking device via a short range communications link (SRCL), the tracking device having a long range communication interface configured to communicate with a tracking server;
a first communications interface adapted to communicate with the tracking server; and
a processor communicatively coupled to the short range communications interface and the first communications interface, the processor adapted to:
serve as a beacon for the tracking device by transmitting a beacon signal to the tracking device; and
serve as a proxy to the tracking device by communicating with the tracking server on behalf of the tracking device after the tracking device loses communication with a home beacon associated with the tracking device, and serving as the proxy to the tracking device includes
receiving tracking server data from the tracking server and transmitting the tracking server data to the tracking device via the SRCL instead of the tracking server data being received at the tracking device directly from the tracking server via the long range communication interface.

19. The wireless communication device of claim 18, wherein serving as the proxy to the tracking device further includes:
receiving tracking device data from the tracking device via the SRCL.

20. The wireless communication device of claim 19, wherein serving as the proxy to the tracking device further includes:
transmitting the tracking device data to the tracking server.

21. The wireless communication device of claim 20, wherein the tracking device data comprises at least one of a check-in message, a walk-in message, a walk-out message, or a location information.

22. The wireless communication device of claim 20, wherein the tracking device data includes at least one of: (a) data pertaining to an amount of time the tracking device has been within communication range of the home beacon; (b) data pertaining to an amount of time the tracking device lost communication with the home beacon; and/or (c) location information of the tracking device at a time where the tracking device lost communication with the home beacon.

23. The wireless communication device of claim 18, wherein the processor adapted to serve as the proxy to the tracking device by communicating with the tracking server on behalf of the tracking device comprises:
communicating with the tracking server via a wireless wide area network (WWAN) using the first communications interface.

24. The wireless communication device of claim 18, wherein the processor is further adapted to:
receive a beacon request message from the tracking device.

25. The wireless communication device of claim 24, wherein the processor is further adapted to:
transmit a beacon availability message to the tracking device; and
receive a beacon confirmation message from the tracking device.

26. The wireless communication device of claim 25, wherein the beacon availability message comprises at least one of energy efficiency information and/or signal to noise ratio (SNR) information of the wireless communication device.

27. The wireless communication device of claim 18, wherein the processor is further adapted to:
receive a unicast beacon request page from the tracking device; and
establish the short range communications link with the tracking device.

28. The wireless communication device of claim 18, wherein the processor is further adapted to:
receive a request from the tracking device to obtain the tracking server data via the SRCL;
transmit the request to the tracking server for the tracking server data via the first communications interface;
receive the tracking server data from the tracking server via the first communications interface; and
transmit the tracking server data to the tracking device via the SRCL.

29. A wireless communication device, comprising:
means for serving as a beacon for a tracking device by transmitting a beacon signal to the tracking device, the tracking device having a long range communication interface configured to communicate with a tracking server; and
means for serving as a proxy to the tracking device by communicating with the tracking server on behalf of the tracking device after the tracking device loses communication with a home beacon associated with the tracking device, and means for serving as the proxy to the tracking device includes
means for receiving tracking server data from the tracking server and transmitting the tracking server data to the tracking device via a short range communications link instead of the tracking server data being received at the tracking device directly from the tracking server via the long range communication interface.

30. A non-transitory computer readable medium having instructions stored thereon for tracking, the instructions which when executed by at least one processor causes the processor to:
serve as a beacon for a tracking device by transmitting a beacon signal to the tracking device, the tracking device having a long range communication interface configured to communicate with a tracking server; and
serve as a proxy to the tracking device by communicating with the tracking server on behalf of the tracking device after the tracking device loses communication with a home beacon associated with the tracking device, and serving as the proxy to the tracking device includes
receiving tracking server data from the tracking server and transmitting the tracking server data to the tracking device via a short range communications instead of the tracking server data being received at the tracking device directly from the tracking server via the long range communication interface.

* * * * *